United States Patent
Kato et al.

(10) Patent No.: US 7,697,187 B2
(45) Date of Patent: Apr. 13, 2010

(54) ELECTROWETTING DEVICE AND VARIFOCAL LENS, OPTICAL PICKUP DEVICE, OPTICAL RECORDING/REPRODUCTION DEVICE, DROPLET OPERATION DEVICE, OPTICAL ELEMENT, ZOOM LENS, IMAGING DEVICE, LIGHT MODULATING DEVICE, AND DISPLAY DEVICE USING THE SAME

(75) Inventors: Yoshiaki Kato, Gunma (JP); Fumisada Maeda, Tokyo (JP)

(73) Assignee: Sony Corporation, Tokyo (JP)

( * ) Notice: Subject to any disclaimer, the term of this patent is extended or adjusted under 35 U.S.C. 154(b) by 267 days.

(21) Appl. No.: 11/898,300

(22) Filed: Sep. 11, 2007

(65) Prior Publication Data

US 2008/0100905 A1 May 1, 2008

(30) Foreign Application Priority Data

Sep. 29, 2006 (JP) .............................. 2006-268216

(51) Int. Cl.
*G02F 1/03* (2006.01)
*G02F 1/06* (2006.01)
*G02B 26/02* (2006.01)

(52) U.S. Cl. ........................ 359/253; 359/228; 359/245; 359/665; 359/666; 345/48; 345/84; 73/514.09

(58) Field of Classification Search ................ 359/228, 359/245, 252, 253, 295, 298, 665, 666; 345/48, 345/55, 84, 85, 105; 361/233, 312, 320, 361/516, 527; 349/114, 141; 324/660; 257/43, 257/191, 200; 368/82, 240
See application file for complete search history.

(56) References Cited

U.S. PATENT DOCUMENTS

| | | | |
|---|---|---|---|
| 3,443,170 A * | 5/1969 | Pulvari | 257/43 |
| 3,516,242 A * | 6/1970 | Lehovec | 368/82 |
| 3,670,130 A | 6/1972 | Greenwood | |
| 4,079,368 A | 3/1978 | DiStefano | |
| 4,371,753 A | 2/1983 | Graf | |
| 5,581,192 A * | 12/1996 | Shea et al. | 324/722 |
| 5,789,100 A * | 8/1998 | Burroughs et al. | 429/90 |
| 6,449,081 B1 * | 9/2002 | Onuki et al. | 359/245 |
| 6,538,823 B2 * | 3/2003 | Kroupenkine et al. | 359/665 |

(Continued)

FOREIGN PATENT DOCUMENTS

EP 1 708 006 A1 10/2006

(Continued)

OTHER PUBLICATIONS

S. Kuiper et al., "Variable-focus liquid lens for minature cameras" Applied Physics Letter, vol. 85, No. 7; Aug. 16, 2004; pp. 1128-1130.

(Continued)

*Primary Examiner*—Loha Ben
(74) *Attorney, Agent, or Firm*—Rader, Fishman & Grauer PLLC

(57) ABSTRACT

Disclosed is an electrowetting device. The electrowetting device includes a conductive or polar liquid material, and an electrode applying voltage to the liquid material through a dielectric layer. In the electrowetting device, the dielectric layer is formed as an anodized portion made of a metal oxide formed by anodizing the electrode, and a voltage applying unit applying voltage between the electrode and the liquid material and a polar capacitor are placed between the electrode and the liquid material.

26 Claims, 15 Drawing Sheets

U.S. PATENT DOCUMENTS

| | | | |
|---|---|---|---|
| 6,603,444 B1 * | 8/2003 | Kawanami et al. | 345/32 |
| 6,665,127 B2 * | 12/2003 | Bao et al. | 359/665 |
| 6,965,480 B2 * | 11/2005 | Kroupenkine | 359/665 |
| 7,006,299 B2 * | 2/2006 | Kroupenkine | 359/665 |
| 7,307,672 B2 * | 12/2007 | Feenstra et al. | 349/15 |
| 7,360,424 B2 * | 4/2008 | Urano et al. | 73/514.06 |

FOREIGN PATENT DOCUMENTS

| | | |
|---|---|---|
| JP | 2001-519539 | 10/2001 |
| JP | 2004-342228 A | 12/2004 |
| JP | 2006-285031 | 10/2006 |
| WO | WO-2004/027489 A1 | 4/2004 |
| WO | WO-2004/038480 A1 | 5/2004 |
| WO | WO-2004/077126 A1 | 9/2004 |
| WO | WO-2005/069054 A2 | 7/2005 |
| WO | WO 2005/096035 A1 | 10/2005 |

OTHER PUBLICATIONS

Extended European Search Report, App. No. 07253862.2-2217, Ref. P031404EP, Feb. 12, 2008 (14 pages).

European Search Report; Application No./Patent No. 07253862.2-2217; Dated Nov. 28, 2007.

* cited by examiner

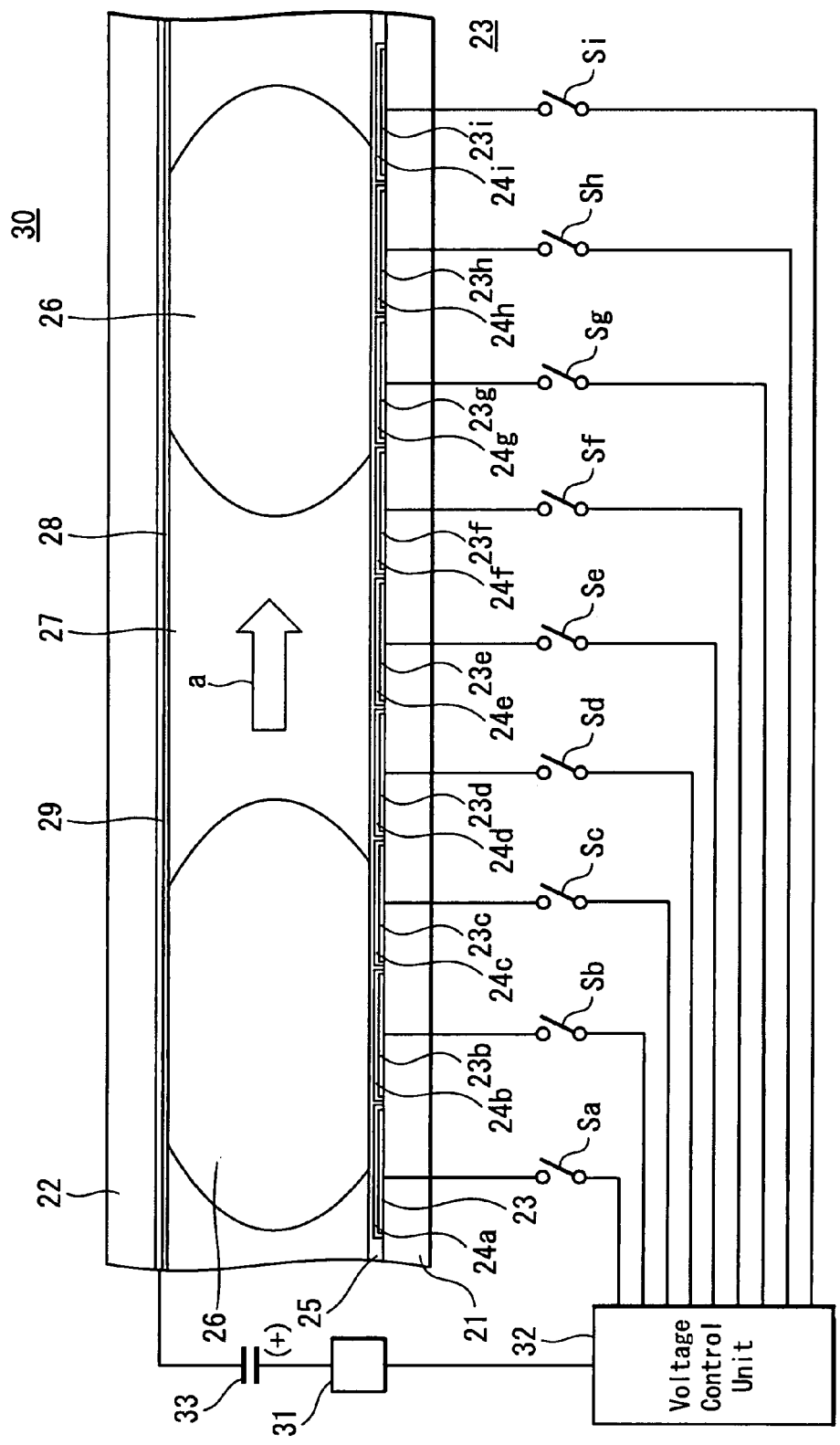

ELECTROWETTING DEVICE AND VARIFOCAL LENS, OPTICAL PICKUP DEVICE, OPTICAL RECORDING/REPRODUCTION DEVICE, DROPLET OPERATION DEVICE, OPTICAL ELEMENT, ZOOM LENS, IMAGING DEVICE, LIGHT MODULATING DEVICE, AND DISPLAY DEVICE USING THE SAME

CROSS REFERENCES TO RELATED APPLICATIONS

The present invention contains subject matter related to Japanese Patent Application JP 2006-268216 filed in the Japanese Patent Office on Sep. 29, 2006, the entire contents of which being incorporated herein by reference.

BACKGROUND OF THE INVENTION

1. Field of the Invention

The present invention relates to an electrowetting device utilizing an electrowetting (electrocapillary) phenomenon, and a varifocal lens, an optical pickup device, an optical recording/reproduction device, a droplet operation device, an optical element, a zoom lens, an imaging device, a light modulating device, and a display device using the same.

2. Description of the Related Art

Varioptic S.A. of France and Royal Philips Electronics N.V. of the Netherlands disclose varifocal lens devices, for example, as electrowetting devices utilizing electrowetting phenomena (see Japanese Unexamined Patent Application Publication (Translation of PCT Application) No. 2001-519539 and S. Kuiper et al., "Variable-focus liquid lens for miniature cameras", Applied Physics Letters, Vol. 85, No. 7, 16 Aug. 2004, pp. 1128-1130, for example).

A varifocal lens described in the aforementioned Japanese Unexamined Patent Application Publication and Applied Physics Letters will be described with reference to schematic cross-sectional views of FIGS. 1A and 1B.

The varifocal lens basically includes a container 310 having a cylindrical shape or the like; a conductive liquid material 301 packed in the container 310; and an insulating liquid material 302 made of a material not mixed with the conductive liquid material 301 and packed in the container 310. The conductive liquid material 301 and the insulating liquid material 302 are both light transmissive, have different refractive indices, and have an equal density (specific gravity). In this example, first electrodes 305 are each continuously formed on inner walls, one edge, and outer surfaces of the container, and dielectric films 304 are formed inside the inner walls. The edge of the container 310 covered with the first electrodes 305 is fluid-tightly sealed by a light transmissive material 309 made of glass, a light transmissive resin, or the like. A water repellent material 303, also called a water repellent coating, is attached to a bottom surface formed by the light transmissive material 309 and the dielectric films 304 on the inner walls of the container 310.

Second electrodes 307 having a ring shape or the like are placed on the other edge (lid side edge) of the container 310 in contact with the conductive liquid material 301. The other edge is fluid-tightly sealed by a light transmissive material 308 made of glass, a light transmissive resin, or the like through a hydrophilic material 306, also called a hydrophilic coating. In this case, edges of the ring-shaped second electrodes 307 are formed to extend on an outer periphery of the light transmissive material 308.

Edges of the first electrodes 305 on an inner surface of the container 310 are formed to separate the first electrodes 305 from the second electrodes 307. In the example shown in the figure, the dielectric films 304 are similarly formed.

In such a configuration, appropriate voltage is applied between the first electrodes 305 and the second electrodes 307 by a voltage application unit 311 to change a curvature of an interface between the conductive liquid material 301 and the insulating liquid material 302. Accordingly, it is possible to change a lens effect on incident light indicated by an arrow Li from outside the light transmissive material 309 and change a focal length.

More specifically, when voltage is not applied to the first and second electrodes 305 and 307, the interface between the conductive liquid material 301 and the insulating liquid material 302 forms part of a spherical surface having a certain radius, as shown in FIG. 1A, by having a balance in surface tension of the packed liquid materials 301 and 302 and inner wall surfaces of the container 310. For example, when salt-containing water is used for the conductive liquid material 301 and silicone oil is used for the insulating liquid material 302, the salt water, that is, the conductive liquid material 301 forms convexity of the interface as shown in FIG. 1A. Here, a contact angle of the conductive liquid material 301 is indicated as θ(0).

When applying voltage between the first electrodes 305 and the second electrodes 307 by the voltage application unit 311, "wettability" of the conductive liquid material 301 to the inner wall surface of the container 310 is improved (this phenomenon is called electrowetting). Thus, the interface between the liquid materials 301 and 302 is changed to increase a radius of curvature of the interface and reduce a contact angle θ(V), for example, as shown in FIG. 1B.

When light is incident from the light transmissive material 309 as indicated by the arrow Li and emitted from the other light transmissive material 308, a lens effect is generated by a difference in refractive index between the liquid materials 301 and 302 and an interface curvature. Furthermore, the liquid interface curvature is changed due to electrowetting by applying voltage, so that a focal length of the lens is changed.

The varifocal lens utilizing such an electrowetting phenomenon is advantageous in that: current is essentially not flown in the varifocal lens except when discharging, causing power consumption extremely small; and the varifocal lens does not have a mechanical drive and thus has a life longer than that of a varifocal lens of the related art moved by a motor or the like. Further, the varifocal lens may save space and provide an auto-focus mechanism with a simple configuration, since the lens does not have to include a motor.

SUMMARY OF THE INVENTION

The varifocal lens disclosed in the aforementioned Japanese Unexamined Patent Application Publication and Applied Physics Letters is driven only at a voltage of about 100V or more and may not be used in practice. This is because it is difficult to deposit a uniform and thin dielectric film on a liquid storing container forming the varifocal lens. This will be described as follows.

As described in the aforementioned Applied Physics Letters, a change in an interface between a conductive or polar liquid and an insulating liquid is represented by the following formula (1):

$$\cos\theta = (\gamma SO - \gamma SL)/\gamma + \in \cdot \in_0 \cdot V^2/(2l\gamma) \quad (1)$$

where:

θ is a contact angle between the conductive liquid material and an inner wall of a container, γSO is a tension of an interface between the insulating liquid material and an inner wall surface of the container, γSL is a tension of an interface between the conductive liquid material and the inner wall surface of the container, γ is a tension of an interface between the conductive liquid material and the insulating liquid material, ∈ is a relative dielectric constant of a dielectric film formed on the inner wall of the container, ∈0 is a dielectric constant under vacuum, l is a thickness of the dielectric film, and V is applied voltage.

The formula (I) will be described with reference to a schematic view of FIG. 2. A dielectric film 402 and a water repellent material 403 are deposited on an electrode 401, and a droplet of a conductive or polar liquid material 404 is placed on the water repellent material 403, where a contact angle of the liquid material 404 is θ0. When voltage V is applied between the electrode 401 and the liquid material 404 by a voltage application unit 405, the contact angle of the liquid material 404 is changed to θ(V) where θ(V)<θ0.

FIG. 3 schematically shows an interface tension and a surface tension during voltage application represented by the formula (I).

Specifically, as is clear from the formula (I), a change in the contact angle θ between the liquid material and the inner wall of the container by an electrowetting phenomenon occurs in direct proportion to the dielectric constant ∈ of the dielectric film times the drive voltage V squared and in inverse proportion to the thickness l of the dielectric film. Accordingly, drive voltage causing an equal change in focal length may be reduced by increasing the dielectric constant ∈ of the dielectric film and reducing the film thickness l.

However, in actual deposition of a dielectric film, it may be difficult to form a high dielectric thin film with a high breakdown strength and a uniform submicron (less than 1 μm) thickness on an inner wall of a container with a cylindrical shape or the like without formation of pinholes.

Drive voltage to change a focal length is high in the varifocal lens of the related art, since the dielectric film has a low dielectric constant ∈ of about 3 and a relatively large thickness l of about several μm. This is a result of difficulty in forming a dielectric thin film for the aforementioned reasons.

Therefore, various electrowetting devices utilizing such electrowetting phenomena such as a varifocal lens, for example a zoom lens and an optical switching element using a varifocal lens, are driven only at a high voltage. Such devices may need a booster circuit for practical use, and a reduction in drive voltage is strongly desired.

In this situation, the present applicant has proposed a varifocal lens using a dielectric film obtained by anodizing an electrode and an optical device using the same in Japanese Patent Application No. 2005-106524 (filed on Apr. 1, 2005). The varifocal lens and the optical device are advantageous in that a dielectric film may be formed with an extremely small thickness using a film obtained by anodizing a metal such as tantalum or niobium; a drive voltage may be reduced due to an extremely high relative dielectric constant of the dielectric film; and the dielectric film may be deposited with a reduced variability in film thickness, so that a change in contact angle of an interface may be controlled with high precision.

It is desirable that various electrowetting devices using such an anodized film as a dielectric film may be AC-driven in order to control driving of the devices more practically.

In view of the aforementioned points, it is desirable that a device utilizing an electrowetting phenomenon may be driven at low voltage using a metal oxide by anodization as a dielectric film and that the device may be AC-driven.

According to an embodiment of the present invention, there is provided an electrowetting device including a conductive or polar liquid material, and an electrode applying voltage to the liquid material through a dielectric layer, where the dielectric layer is formed as an anodized portion made of a metal oxide formed by anodizing the electrode. Further, a voltage applying unit applying voltage between the electrode and the liquid material, and a capacitor are placed between the electrode and the liquid material.

According to an embodiment of the present invention, there is provided a varifocal lens including: a pair of light transmissive materials; and a conductive or polar first liquid material and an insulating second liquid material, both stored between the light transmissive materials, the varifocal lens including a first electrode applying voltage to the first liquid material through a dielectric layer; and a second electrode conducted to the first liquid material. The dielectric layer is formed as an anodized portion made of a metal oxide formed by anodizing the first electrode. Further, a voltage applying unit applying voltage between the first electrode and the second electrode, and a capacitor are placed between the first electrode and the second electrode.

According to an embodiment of the present invention, there is provided an optical pickup device including: a light source; a light receiving unit; an objective lens facing an optical recording medium; and an optical system having functions to guide outgoing light from the light source to the objective lens and to focus rays of light from the objective lens on the light receiving unit by a focusing lens. The optical pickup device irradiates a predetermined position of the light recording medium with light from the light source. The optical system has the varifocal lens according to the aforementioned embodiment of the present invention.

Furthermore, an optical recording/reproduction device according to an embodiment of the present invention includes the optical pickup device according to the aforementioned embodiment of the present invention.

According to an embodiment of the present invention, there is provided a droplet operation device including: a substrate; and an electrode array formed on the substrate and covered with a dielectric layer. A droplet is attached onto the dielectric layer, and a common electrode conducted to the droplet is provided such that the common electrode faces the electrode array. The droplet operation device includes a voltage control unit controlling voltage applied between the common electrode and the electrode array to move the droplet in an array direction of the electrode array. The dielectric layer covering the electrode array is formed as an anodized portion made of a metal oxide formed by anodizing the electrode array. Further, a voltage applying unit and a capacitor are placed between the electrode array and the common electrode.

According to an embodiment of the present invention, there is provided an optical element including: a pair of light transmissive materials; and a conductive or polar first liquid material and an insulating second liquid material, both stored between the light transmissive materials, the optical element including a first electrode applying voltage to the first liquid material through a dielectric layer; and a second electrode conducted to the first liquid material. Any one of the first and second liquid materials is made of a material having a light transmittance lower than that of a material of the other liquid material. A shape of an interface between the first liquid material and the second liquid material is changed by controlling voltage applied to the first and second electrodes, so that an amount of light transmitted through the first and second liquid materials is controlled. The dielectric layer is formed as an anodized portion made of a metal oxide formed by anodizing the first electrode. Further, a voltage applying unit and a capacitor are placed between the first electrode and the second electrode.

According to an embodiment of the present invention, there is provided a zoom lens including: at least one varifocal lens having a pair of light transmissive materials; and a conductive or polar first liquid material and an insulating second liquid material, both stored between the light transmissive materials, and having a first electrode applying voltage to the first liquid material through a dielectric layer; and a second electrode conducted to the first liquid material. The at least one varifocal lens includes at least two interfaces between the first liquid material and the second liquid material. A shape of the interface between the first liquid material and the second liquid material is changed by controlling voltage applied to the first and second electrodes, so that a focal length of the lens is changed to control a magnification of the lens. The dielectric layer of the varifocal lens is formed as an anodized portion made of a metal oxide formed by anodizing the first electrode. Further, a voltage applying unit and a capacitor are placed between the first electrode and the second electrode.

According to an embodiment of the present invention, there is provided an imaging device including: a zoom lens; a varifocal lens; an optical element having a diaphragm or shutter function; and a solid imaging element. At least one of the zoom lens, the varifocal lens, and the optical element includes a pair of light transmissive materials; and a conductive or polar first liquid material and an insulating second liquid material, both stored between the light transmissive materials, and includes a first electrode applying voltage to the first liquid material through a dielectric layer; and a second electrode conducted to the first liquid material. The dielectric layer is formed as an anodized portion made of a metal oxide formed by anodizing the first electrode. Further, a voltage applying unit and a capacitor are placed between the first electrode and the second electrode.

According to an embodiment of the present invention, there is provided a light modulating device including: a pair of light transmissive materials; and a conductive or polar first liquid material and an insulating second liquid material, both stored between the light transmissive materials, the light modulating device including a first electrode applying voltage to the first liquid material through a dielectric layer; and a second electrode conducted to the first liquid material. Any one of the first and second liquid materials is made of a material having a light transmittance lower than that of a material of the other liquid material. A shape of an interface between the first liquid material and the second liquid material is changed by controlling voltage applied to the first and second electrodes, so that a light modulating element is formed in which an amount of light transmitted through the first and second liquid materials is controlled corresponding to an input information signal. The dielectric layer is formed as an anodized portion made of a metal oxide formed by anodizing the first electrode. Further, a voltage applying unit and a capacitor are placed between the first electrode and the second electrode.

According to an embodiment of the present invention, there is provided a display device including: the light modulating device according to the aforementioned embodiment of the present invention; and a light source device of inputting light to the light modulating device, where the light modulating element is provided corresponding to a pixel.

As described above, an electrowetting device according to an embodiment of the present invention and a varifocal lens, an optical pickup device, an optical recording/reproduction device, a droplet operation device, an optical element, a zoom lens, a light modulating device, and a display device using the same employs, as a dielectric film provided between a conductive or polar liquid material and an electrode, a metal oxide formed by anodizing the electrode. An anodized portion formed by the metal oxide may have a thickness easily and precisely controlled by controlling voltage applied during anodization.

More specifically, various materials providing oxides having a relatively high dielectric constant by anodization may be used such as valve metals such as aluminum and tantalum generating alumina and tantalum pentoxide films by anodization. Drive voltage to change a contact angle of a liquid material may be reduced using, as a dielectric film, an anodized portion having high insulating properties and a high dielectric constant and having a film thickness easily reduced.

Further, an electrowetting device according to an embodiment of the present invention includes a capacitor, in addition to a voltage application unit, between an electrode and a liquid material, so that the device may be AC-driven.

An electrowetting device may be used as one capacitor as such. When the electrowetting device is driven at DC voltage, charges are gradually injected into a dielectric layer to reduce a change in contact angle by an electrowetting phenomenon. It is known that the device may be driven by an AC power supply to prevent this. However, since a dielectric film formed by an anodized portion exhibits a valve effect, an electrowetting device using the dielectric film functions as a capacitor, and thus the device itself may not be AC driven.

On the contrary, an electrowetting device according to an embodiment of the present invention includes a capacitor, in addition to a voltage application unit, inserted between an electrode and a liquid material, so that the device may be non-polarized in its entirety and thus may be AC-driven. When the device is AC-driven, it is possible to avoid a gradual reduction in the effect of electrowetting phenomenon by DC-driving the device.

An electrowetting device according to an embodiment of the present invention may be driven at low voltage using a metal oxide by anodization as a dielectric film and may be AC-driven.

In a varifocal lens according to an embodiment of the present invention and an optical pickup device or an optical recording/reproduction device using the same, the varifocal lens may be driven at low voltage and may be AC-driven.

A droplet operation device according to an embodiment of the present invention may be driven at reduced voltage to operate a droplet and may be AC-driven.

An optical element or a zoom lens according to an embodiment of the present invention may be driven at reduced voltage and may be AC-driven.

Similarly, a light modulating device or a display device according to an embodiment of the present invention may be driven at reduced voltage and may be AC-driven.

BRIEF DESCRIPTION OF THE DRAWINGS

FIG. 11 is a schematic cross-sectional view of an example of a droplet operation device according to an embodiment of the present invention.

DESCRIPTION OF THE PREFERRED EMBODIMENTS

A best mode for carrying out the present invention will be described below; however, the present invention is not limited to the following examples.

Figure 4:
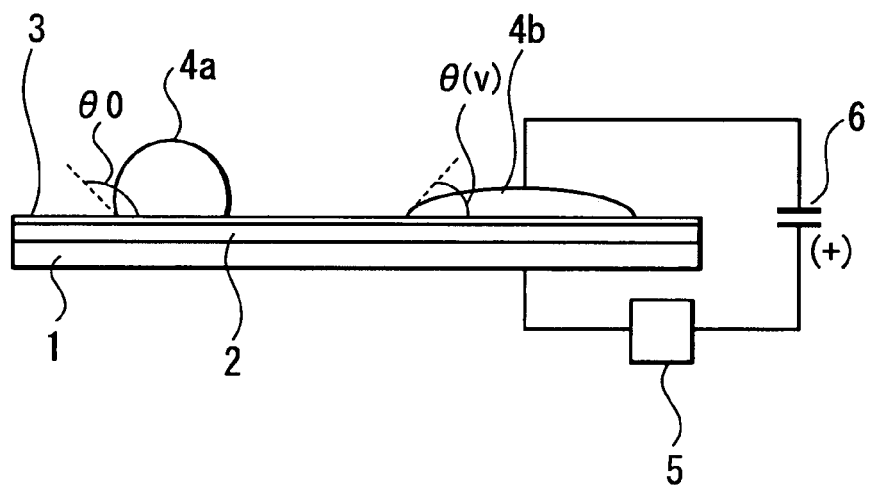
FIG. 4 is a view describing a principle of driving of an electrowetting device according to an embodiment of the present invention.

FIG. 4 is a view describing a principle of driving of an electrowetting device according to an embodiment of the present invention. An anodized portion 2 is formed as a dielectric film on an electrode 1, where the anodized portion 2 is made of a metal oxide formed by anodizing the electrode 1. Conductive or polar liquid materials 4a, 4b are attached onto the anodized portion 2 through a water repellent material 3. A contact angle of the conductive material 4a is θ0 when voltage is not applied by a voltage application unit 5. When voltage is applied by the voltage application unit 5, a contact angle of the liquid material 4b is changed to θ(V) where θ(V)<θ0.

In this case, the anodized portion 2 is provided as a dielectric film, so that the anodized portion 2 may have an extremely low film thickness as described later, and may have a relatively high dielectric constant to considerably reduce drive voltage. Further, since the film thickness may be uniform, variability in control precision may be suppressed.

When an electrowetting device of the related art is driven at DC voltage, charges are gradually injected into a dielectric film placed between an electrode and a liquid to reduce the effect of electrowetting phenomenon. Japanese Unexamined Patent Application Publication No. 2001-249261, for example, shows that the device may be driven by an AC power supply to prevent this charge injection.

An anodized portion made of a metal oxide has a valve effect as described above and has an insulating direction and a conductive direction. Aluminum and tantalum capacitors generally thus include polarity. When an anodized portion is used as a dielectric film, it may not be possible to drive an electrowetting device with AC-current to prevent charges from being gradually injected into the dielectric film, that is, the anodized portion.

The electrowetting device of the present embodiment using an anodized portion as a dielectric film may be a capacitor having the electrode 1 as an anode and the liquid materials 4a, 4b as cathodes. It is effective to serially connect cathodes of a polar capacitor and a non-polar capacitor, or to serially connect cathodes of two polar capacitors. Therefore, when a polar capacitor is inserted into the electrowetting device defined as a polar capacitor, in addition to the voltage application unit as a driving power supply, the electrowetting device is non-polarized and may be AC-driven. As a result of AC-driving the device, charges are gradually injected into the anodized portion, so that it is possible to prevent a reduction in the effect of electrowetting phenomenon.

Here, a capacitance of the inserted capacitor $C_{add}$, a capacitance of the electrowetting device $C_{ew}$, drive voltage V, and voltage applied to the electrowetting device $V_{ew}$ satisfy the following formula:

$$V_{ew} = C_{add}/(C_{add}+C_{ew}) \times V$$

Specifically, voltage lower than the drive voltage V applied by the voltage application unit 5 is applied to the electrowetting device by inserting a capacitor 6. However, this loss of voltage may not have an adverse effect if a ratio of the capacitance of the polar capacitor to the capacitance of the electrowetting device $C_{add}/C_{ew}$ is sufficiently high.

Although an electrowetting device of the related art may not be driven at low voltage, the electrowetting device of the present embodiment may be driven at low voltage by providing the anodized portion 2 as a dielectric film and placing the capacitor 6 between the electrode 1 and the voltage application unit 5, with an anode being connected to the voltage application unit 5 if a polar capacitor is used as the capacitor 6. Further, when the electrowetting device is AC-driven, it is possible to avoid a reduction in the effect of electrowetting phenomenon by gradual injection of charges into the anodized portion provided as a dielectric film. Thus, variability in control precision may be suppressed and high precision control may be performed.

Such a configuration having an anodized portion and a capacitor may be easily used for any device using an electrowetting phenomenon, and the device may be driven at low voltage and controlled with high precision.

Next, embodiments of a varifocal lens and others using the electrowetting device will be described.

[1] First Embodiment

First, an embodiment of a varifocal lens using an electrowetting device according to an embodiment of the present invention will be described with reference to schematic cross-sectional views of FIGS. 5A and 5B.

The varifocal lens 10 includes a container 9 having a cylindrical shape or the like and made of an insulating material; a conductive or polar first liquid material 11 stored in the container 9; and an insulating second liquid material 12 stored in the container 9. Materials both light transmissive, having different refractive indices, and not mixed with each other are selected as the first and second liquid materials 11 and 12. A difference in specific gravity is preferably small between the first liquid material 11 and the second liquid material 12 in forming the varifocal lens. When the difference in specific gravity is small, it is possible to suppress deformation of an interface shape due to vibration or gravity. However, this is not the case if an effect of vibration or gravity may be ignored due to an extremely small size of the container 9 of less than 1 mm or other reasons.

The shape of the container 9 may not be limited to cylindrical shape; however, may be a truncated cone shape or a frustum of a cone; that is, conical shape excluding a tip.

Edges 9A and 9B as opening edges of the container 9 are fluid-tightly sealed by light transmissive materials 18 and 19 made of round glass or a light transmissive resin, for example, using an epoxy resin or the like. Specifically, the first and second liquid materials 11 and 12 are stored between the light transmissive materials 18 and 19. For example, the first liquid material 11 is stored on the one edge 9A of the container 9 (on a light transmissive material 18 side), and the second liquid material 12 is stored on the other edge 9B of the container 9 (on a light transmissive material 19 side). In this example, an outer surface of the light transmissive material 18 is a curved surface with refracting power; however, the outer surface may be a plan surface. An outer surface of the light transmissive material 19 may also be a curved surface with refracting power, and an inner surface of the light transmissive material 18 and/or an inner surface of the light transmissive material 19 may be a curved surface. A structure or thin film having a diffraction effect, polarizing effect, or the like may optionally be provided on an outer surface.

Incident light may pass through the varifocal lens either from the first liquid material 11 or from the second liquid material 12 appropriately according to an application.

First electrodes 15 are each continuously formed on an inner wall, the one edge 9B with the second liquid material 12 stored, and an outer periphery of the container 9. In the present embodiment, anodized portions 14 made of a metal oxide formed by anodization are provided as dielectric films having a predetermined dielectric constant on surfaces of the first electrodes 15. In the example shown in the figure, the anodized portions 14 are formed only on inner wall side surfaces of the container 9.

Edges of the first electrodes 15 and the anodized portions 14 on inner surfaces of the container 9 are formed to have a distance d from the other edge 9A of the container 9. A water repellent material 13, also called a water repellent coating, is attached to cover the inner surface of the container 9 including the first electrodes 15 and the anodized portions 14 and an inner surface of the light transmissive material 19.

Second electrodes 17 having a ring shape, for example, are placed between the edge 9A of the container 9 and an inner surface of the light transmissive material 18 placed on the edge 9A of the container 9. The second electrodes 17 are formed to extend on an outer periphery of the light transmissive material 18. The second electrodes 17 formed by a light transmissive conductive material may have a round shape, not a ring shape, for example. A hydrophilic material 16 made of a conductive material, also called a hydrophilic coating, is attached to cover inner surfaces of the second electrodes 17 and the light transmissive material 18. When the light transmissive material 18 is formed by glass and its inner surface is cleaned to be kept hydrophilic, the hydrophilic material 16 does not have to be present.

A voltage application unit 8 is connected to the first electrode 15 extending on an outer periphery on the edge 9B of the container 9 and to the second electrode 17 extending on an outer periphery of the light transmissive material 18 in order to apply voltage to the electrodes. Further, a capacitor 6 is placed between the first electrode 15 and the second electrode 17, between the second electrode 15 and the voltage application unit 8 in this case, with an anode being connected to the voltage application unit 8 if a polar capacitor is used as the capacitor 6.

Figure 5A:
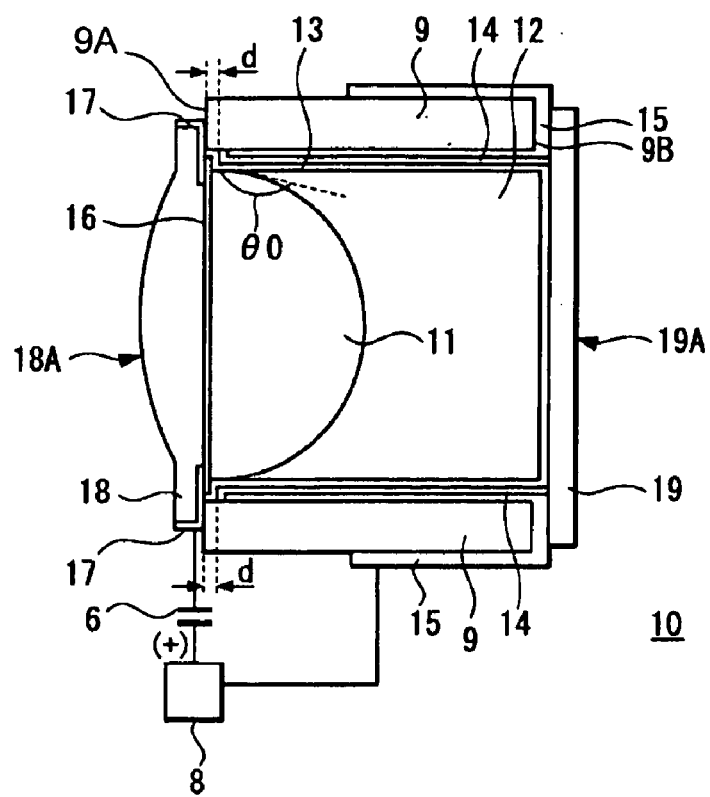
FIG. 5 is a schematic cross-sectional view of an example of a varifocal lens according to an embodiment of the present invention.
Figure 5B:
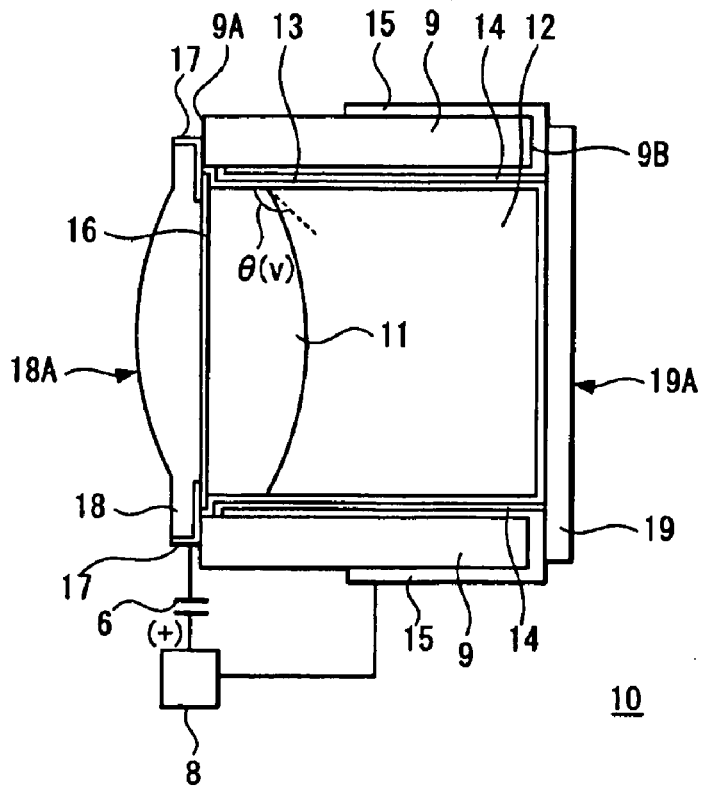

In such a configuration, when a surface tension of the first liquid material 11 is larger than a surface tension of the second liquid material 12, for example, a state shown in FIG. 5A may be changed into a state shown in FIG. 5B by changing voltage applied by the voltage application unit 8 from relatively low voltage Va to relatively high voltage Vb (that is, Va<Vb, for example Va=0). A contact angle $\theta(Va)$ of the first liquid material 11 is relatively large in the state shown in FIG. 5A, and a contact angle $\theta(Vb)$ of the first liquid material 11 is relatively small in the state shown in FIG. 5B, and thus a curvature of an interface between the first liquid material 11 and the second liquid material 12 may be controlled. This makes it possible to change a focal length. For example, when a material for the first liquid material 11 is selected to have a refractive index higher than that of the second liquid material 12, the focal length may be increased by reducing the contact angle of the first liquid material 11 shown in FIG. 5A to the contact angle shown in FIG. 5B.

A valve metal capable of forming a metal oxide by anodization such as aluminum or tantalum is used for the first electrodes 15 in the varifocal lens 10 of the present embodiment. The first electrodes 15 are anodized to form anodized portions 14 of alumina ($Al_2O_3$) or tantalum pentoxide ($Ta_2O_5$) films or the like as dielectric films in a varifocal lens of the related art. Accordingly, high dielectric constant and extremely thin films may be provided with high insulation properties.

Various other valve metals capable of forming a metal oxide having a high dielectric constant by anodization such as niobium, hafnium, and titanium may be used as materials for the first electrodes 15.

An example of a method for producing the varifocal lens of the present embodiment will be described, where tantalum as an electrode material is anodized to prepare the anodized portions 14 made of tantalum pentoxide.

First, tantalum thin films, for example, are deposited by sputtering or the like with a thickness enough to avoid formation of pinholes each continuously on the one edge 9B and the inner walls of the container 9 having a cylindrical shape or the like and part of the outer periphery of the container 9 as an electrode take-out region. The container 9 may also be prepared from tantalum.

Next, the thin films are anodized by dipping only the inner walls of the container 9 in an electrolytic solution of phosphoric acid or the like.

Thereafter, the edge 9B of the container 9 with the first electrodes 15 attached is fluid-tightly sealed by the one light transmissive material 19 using an adhesive of an epoxy resin, for example. The water repellent material 13 is attached to the inner surface of the container 9. The insulating second liquid material 12 and the conductive or polar first liquid material 11 are injected into the container 9 in this order. An electrolytic solution such as salt water or an aqueous sodium sulfate ($Na_2SO_4$) solution, or an ionic liquid may be used for the conductive or polar first liquid material 11. Silicone oil may be used for the insulating second liquid material 12, for example. Then, the second electrodes 17 having the aforementioned shape described in FIG. 5 are attached onto the light transmissive material 18 by sputtering or the like. Further, the hydrophilic material 16 is deposited on a surface of the light transmissive material 18, and then the other edge 9A of the container 9 is fluid-tightly sealed by the hydrophilic material 16 using an adhesive or the like. The varifocal lens of the present embodiment may be provided in this manner.

In an electrowetting device of the related art such as a varifocal lens, a dielectric film is formed by vacuum deposition, specifically, sputtering or chemical vapor deposition (CVD), or by spin coating, for example. In this case, it may be necessary to prepare a base electrode. Therefore, dielectric breakdown may occur when there are defects such as pinholes, disadvantageously. Further, it may be necessary to deposit the film with a uniform thickness on an inner wall of a container. However, pinholes are easily formed depending on a surface state of the base electrode. To prevent this, it may be necessary to increase a thickness of the dielectric film, and thus it may be difficult to reduce drive voltage, as shown in the above formula (1).

When the dielectric film is deposited on a surface that is not a plane, for example an inner wall of a cylinder, by such a method, the film tends to have a non-uniform thickness. Therefore, as similarly shown in the above formula (I), an interface between a conductive or polar first liquid material 11 and an insulating second liquid material 12 is not spherical, so that a lens does not have an excellent curvature and may have deteriorated optical quality.

On the contrary, in an electrowetting device according to an embodiment of the present invention, a thin film of a metal such as tantalum is not entirely anodized and part of the thin film is preserved as a metal, and the remaining metal tantalum layer may be used as an electrode as is. Specifically, only a surface of a metal electrode is anodized to form a dielectric film, so that pinholes are theoretically not formed and dielectric breakdown is difficult to occur, advantageously.

Since the anodized portion has an increased volume during conversion into a metal oxide, the anodized portion forms a dense film, making it possible to suppress formation of pinholes.

Further, when a metal material such as tantalum is deposited on an inner wall of a container whose base material is a dielectric substance, dielectric breakdown does not occur even if some pinhole defects are present in the film of a metal such as tantalum, and thus such defects are not of importance in practical use. Further, since dielectric breakdown does not occur until formation voltage in the metal oxide formed by anodization, the resulting anodized portion has a high breakdown strength.

A thickness of the film formed by anodization depends on formation voltage. For example, the film using tantalum theoretically has a thickness of about 1.8 nm at a formation voltage of 1 V. The film thickness is uniform because anodization is performed by dipping. That is, even if the initially deposited film of a metal such as tantalum has a non-uniform thickness, the resulting anodized portion has a uniform film thickness. Therefore, a lens curvature may be excellently maintained spherical; occurrence of aberration may be suppressed to enable high precision operation; and an optical device such as a varifocal lens may be formed with excellent optical properties. Examples of the optical device include an optical element having a diaphragm or shutter function, a zoom lens, a light modulating device, and a display device, which will be described later. The same effect may be exhibited by various other electrowetting devices in which light is allowed to pass through a liquid material.

Such a production method by anodization is widely used for tantalum capacitors and the like. Production is extremely simple, since a device configuration is relatively simple and a production technique is established.

Accordingly, an electrowetting device such as a varifocal lens according to an embodiment of the present invention may be produced by a simple apparatus and a simple method, as compared with a case of the related art where a dielectric film is formed by vacuum deposition, spin coating, or the like, and may be mass produced.

The varifocal lens described in the aforementioned Applied Physics Letters includes a dielectric film having a relative dielectric constant of about 3 and a thickness of about 3 μm.

On the contrary, in a varifocal lens according to an embodiment of the present invention, metal tantalum anodized at 100 V, for example, has a relative dielectric constant of about 27 and a film thickness of about 0.18 μm. A component $\in/l$ of the right hand second term in the above formula (1) is about 150 times. Since drive voltage is 1/square root of $\in/l$, a drive voltage for a varifocal lens according to an embodiment of the present invention is about 1/12 for the varifocal lens described in the aforementioned Japanese Unexamined Patent Application Publication (Translation of PCT Application) No. 2001-519539 and Applied Physics Letters.

For example, the varifocal lens described in the aforementioned Applied Physics Letters using salt water as a conductive material and silicone oil as an insulating material is driven at a voltage of about 120V to change a spherical degree from −100 D (diopter) to +50 D. On the contrary, a similar change in spherical degree may be realized by driving a varifocal lens according to an embodiment of the present invention using the same materials for a conductive material and an insulating material at a voltage of only about 10 V.

Specifically, when a voltage of 10 V is applied between the first electrodes 15 and the second electrodes 17 by the voltage application unit 8 in the varifocal lens of the present embodiment shown in FIG. 5, a spherical degree may be changed by about 150 D from a value in a state where voltage is not applied.

Further, in this case, since formation voltage is 100V, a breakdown strength is sufficient.

When voltage applied during anodization is controlled to reduce the film thickness of the anodized portions, it is possible to further reduce the drive voltage to realize a similar change in spherical degree at a drive voltage of about 5V or 3V.

In the varifocal lens 10, the capacitor 6 is placed between the second electrode 17 and the voltage application unit 8. If the capacitor is a polar capacitor, the anode of the polar capacitor 6 is placed on a voltage application unit 8 side. The capacitor 6 is placed between the electrode 17 and the voltage application unit 8, so that the electrowetting device, specifically, the varifocal lens may be non-polarized and AC-driven as described above. Accordingly, it is possible to avoid a reduction in the effect of electrowetting phenomenon due to gradual injection of charges into the anodized portion 14 provided as a dielectric film, and a focal point may be controlled with high precision.

Figure 6:
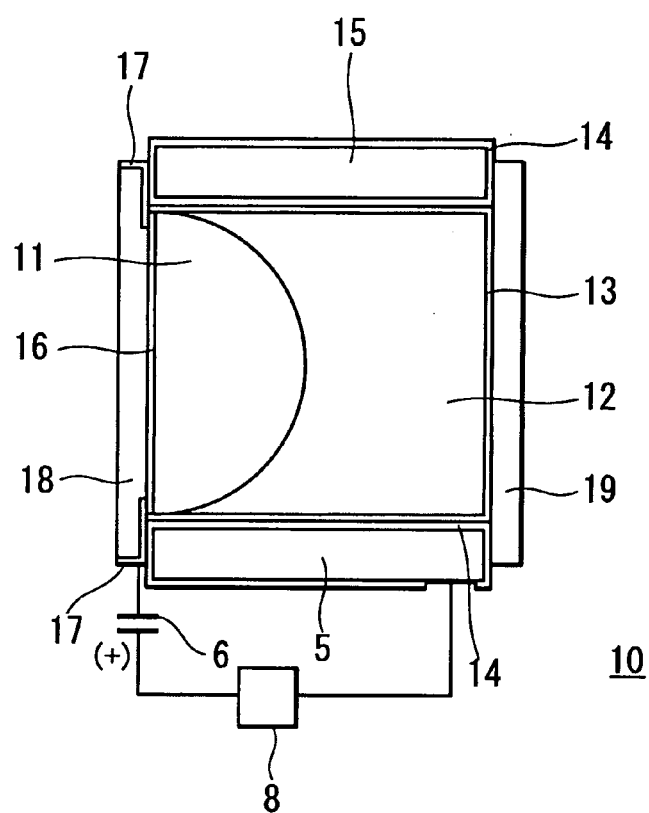
FIG. 6 is a schematic cross-sectional view of an example of a varifocal lens according to an embodiment of the present invention.

FIG. 6 shows the varifocal lens shown in FIG. 5, where a container is formed by a material of the first electrodes 15 to use the first electrodes 15 also as a container, and whole surfaces of the first electrodes 15 also used as a container are anodized to provide the anodized portions 14. In FIG. 6, portions corresponding to those of FIG. 5 are indicated by the same symbols, and repeated description is omitted. The anodized portion 14 is removed from part of the first electrode 15 connected to the voltage application unit 8. Alternatively, it is possible to provide a projection in part of the container, specifically, the first electrode 15; perform anodization while not dipping this part in an anodizing solution; and then remove the projection to form a region connected to the voltage application unit 8.

The varifocal lens having such a configuration may be advantageously produced, because it may not be necessary to deposit the first electrodes 15 on part of surfaces of a container having a cylindrical shape or the like by sputtering or the like.

Figure 7:
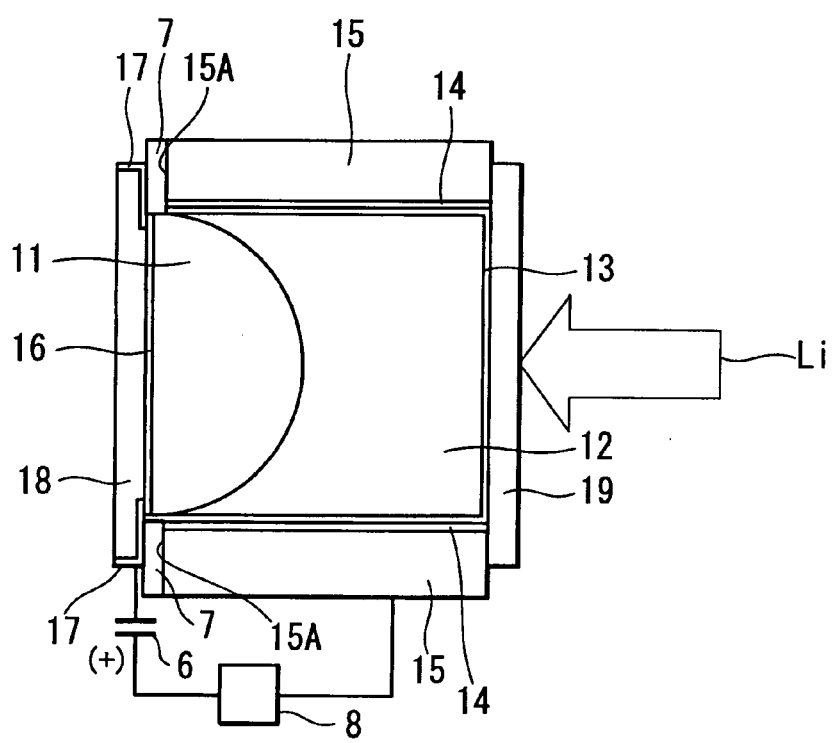
FIG. 7 is a schematic cross-sectional view of an example of a varifocal lens according to an embodiment of the present invention.

FIG. 7 shows an example of using the first electrodes 15 as a container, as in the aforementioned example shown in FIG. 6, where the anodized portions 14 are formed only on inner surfaces of the first electrodes 15, and isolating members 7 ring-shaped, for example, and made of an isolating material are present between edges 15A of the first electrodes 15 and the second electrode 16. In FIG. 7, portions corresponding to those of FIGS. 5 and 6 are indicated by the same symbols, and repeated description is omitted. The varifocal lens 10 having such a configuration may be produced in a simple process and formed with excellent properties.

The varifocal lens having a configuration shown in FIG. 6 or 7 may be driven at reduced voltage as compared with a varifocal lens of the related art and may have a sufficient breakdown strength, as in the aforementioned example shown in FIG. 5. Further, the varifocal lens may be AC-driven and controlled with high precision, since the lens has the capacitor 6.

Figure 8:
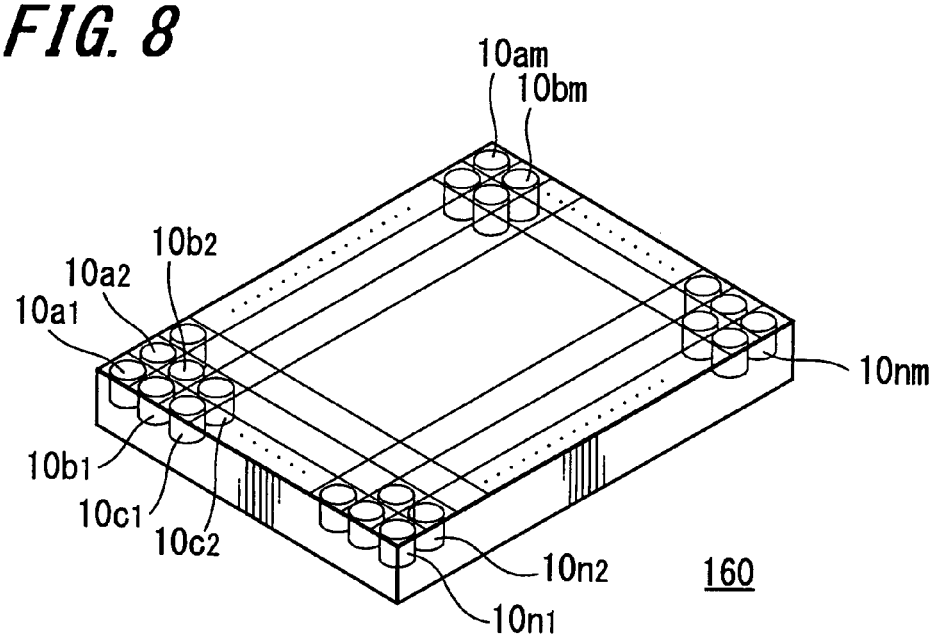
FIG. 8 is a schematic cross-sectional view of an example of a lens array type varifocal lens according to an embodiment of the present invention.

A lens array 160 may be formed by two-dimensionally arranging such varifocal lenses together as shown in FIG. 8. In the example shown in FIG. 8, n varifocal lenses (for example, varifocal lenses $10a1, 10b1, \ldots 10n1$) are arranged in one direction and m varifocal lenses (for example, varifocal lenses $10a1, 10a2, \ldots 10am$) are arranged in a direction approximately perpendicular to the above direction to form the lens array 160 having n×m varifocal lenses in total. In FIG. 8, only the first and second liquid materials are shown for the varifocal lens and the electrodes of applying voltage to the first liquid material and the anodized portions are not shown; however, each of the varifocal lenses may have a configuration shown in FIG. 5, 6, or 7.

Also in this case, the whole lens array 160 may be driven at low voltage by providing the anodized portions (not shown) and may be AC-driven and controlled with high precision by placing the capacitor.

Figure 9:
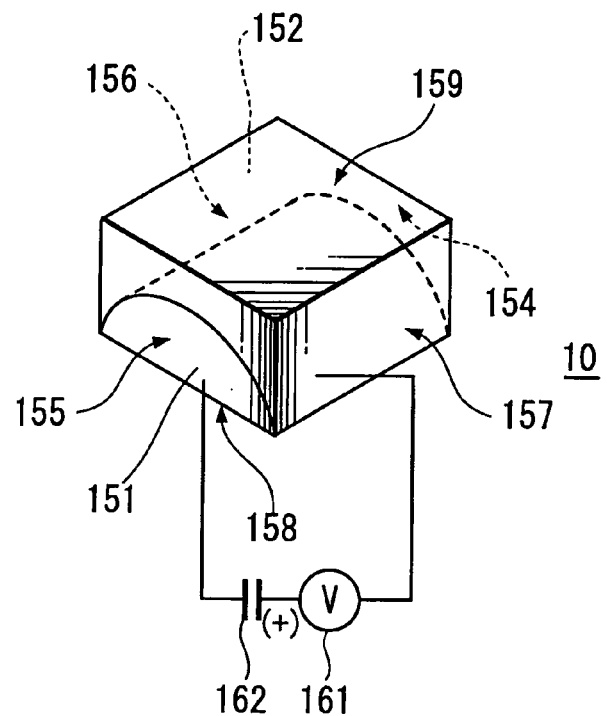
FIG. 9 is a schematic view of an example of a varifocal lens according to an embodiment of the present invention.

In the aforementioned one or more varifocal lenses, a shape of the container or the electrodes utilized as a container is not limited to a cylindrical shape. The shape of the container may be a conical shape excluding a tip, that is, a truncated cone shape or a frustum of a cone or may be rectangular parallelepiped as shown in FIG. 9. FIG. 9 shows an example where first and second liquid materials 151 and 152 are placed in a rectangular parallelepiped container to form an interface that forms part of a cylinder and has a round roof shape. Opposite side surfaces 154 and 155 of the rectangular parallelepiped container is attached to the arc-shaped first liquid material 151 as shown in FIG. 9. A first electrode, an anodized portion, and a water repellent material are attached to an inner surface of each of the other side surfaces 156 and 157. A second electrode not in contact with the first electrode is formed on a bottom surface 158 through a hydrophilic material. In this manner, a cylindrical type varifocal lens 10 may be formed, where only a contact angle of the first liquid material with the side surfaces 156 and 157 is changed. A voltage application unit 161 is provided between an electrode provided on the bottom surface 158 (not shown) and an electrode provided on the side surfaces 156 and 157, and a capacitor 162 is placed between the electrode provided on the bottom surface 158 (not shown) and the voltage application unit 161.

Further, a lenticular lens type lens array may be formed by arranging such cylindrical type varifocal lenses 10 together as shown in FIG. 8.

When the lenticular lens type lens array may be formed, the lens array may be used for a display device that may display a three-dimensional image by voltage control, and may provide a small three-dimensional display device driven at practical voltage.

Also in this case, the lenticular lens type lens array may be driven at low voltage by providing the anodized portions (not shown) and may also be AC-driven and controlled with high precision by placing the capacitor 162 between the electrode (not shown) and the voltage application unit 161.

As described above, a varifocal lens according to an embodiment of the present invention employs an anodized portion formed by anodization as a dielectric film, so that the varifocal lens may be produced by a simple method and the dielectric film may be thinner than a film formed by a vacuum thin film formation method of the related art. Accordingly, a thickness of the dielectric film may be reduced and a material having a higher dielectric constant may be easily used. Therefore, drive voltage to realize a desired change in focal length (change in spherical degree) may be considerably reduced as compared with the related art. Further, since the dielectric film may be deposited with high precision and a uniform thickness by a production method simpler than that of the related art, it is possible to avoid deterioration of optical properties caused by variability in film thickness; and to suppress formation of pinholes, or avoid an effect of pinholes when a container is made of an insulating material.

Further, the varifocal lens may be AC-driven and controlled with high precision, since the lens has a capacitor as described above.

Consequently, it is possible to provide a varifocal lens that has excellent optical properties, may be driven at reduced voltage, and has excellent controllability.

The aforementioned anodized film of a valve metal has a relatively small thickness of submicrons and a high dielectric constant of about 10 to 50. However, the anodized film does not have a relatively low surface energy and is thus difficult to exhibit a high water repellent effect. Therefore, it may be necessary to perform water repellent treatment for a surface of the anodized portion to use the anodized film for an electrowetting device. However, since the anodized portion has a relatively thin film thickness and a high dielectric constant, most part of drive voltage is applied to the water repellent coating layer, and thus dielectric breakdown of the water repellent coating layer may easily occur. Therefore, it is desirable to avoid occurrence of dielectric breakdown of the water repellent coating layer.

As is clear from the formula (I), an electrowetting phenomenon occurs in direct proportion to a dielectric constant $\in$ of the dielectric film times drive voltage V squared and in inverse proportion to a thickness l of the dielectric film. Therefore, the drive voltage may be reduced when the dielectric constant $\in$ may be increased and the film thickness l may be reduced. When the film thickness l is non-uniform, the electrowetting phenomenon is non-uniform, and thus high precision operation based on this phenomenon may not be performed. That is, variability in film thickness greatly affects precision.

When the varifocal lens is driven at AC voltage, charges are gradually injected into the dielectric film and the effect of electrowetting phenomenon is reduced. To prevent this, the varifocal lens may be driven by an AC power supply as described above. A dielectric film obtained by anodizing tantalum at 100 V has a thickness of about 180 nm and a relative dielectric constant of about 27. Materials used for a water repellent coating generally have a low dielectric constant. In particular, a fluorinated compound is suitable for a water repellent coating, but has a dielectric constant of only about 2. A state where a water repellent coating layer is on the dielectric film may be a serial connection of a capacitor formed by a dielectric and a capacitor formed by a water repellent layer.

For example, when parylene (a p-xylylene resin) having a thickness of 3 μm is formed as a dielectric film and AF1600 (manufactured by DuPont, trade name) having a thickness of 10 nm is formed as a water repellent coating layer, a voltage applied to the water repellent coating layer is about 0.5% based on the total voltage. An anodized portion obtained by anodizing tantalum at 100 V has a thickness of about 180 nm and a relative dielectric constant of about 27. When the above material (AF1600, manufactured by DuPont, trade name) is used as a water repellent material, a voltage applied to the water repellent material is about 50% based on the total voltage. Moreover, the anodized portion and the water repellent material have an apparent specific dielectric constant of about 15 in total, resulting in loss of an advantage of using an anodized film that is a material with a high dielectric constant. Further, dielectric breakdown may occur in the water repellent material to which high voltage is applied.

Therefore, a material that may be formed to have a small thickness reduced to nanometers is preferably used for the water repellent material. Leakage current may be increased to make insulating properties negligible by reducing the film thickness of the water repellent material.

In reducing the film thickness to nanometers (less than 1 μm) as described above, a fluorinated silane coupling agent that is a reactive water repellent coating material is suitable, and Optool DSX (manufactured by Daikin Industries, Ltd., trade name) may be used, for example. A reactive water repellent coating material such as Optool DSX (manufactured by Daikin Industries, Ltd., trade name) may have a film thickness of less than 10 nm, for example about 5 nm or less by a processing method. That is, the material may have a film thickness similar to that of a monomolecular film.

When the water repellent material has an extremely thin film thickness, heat generation is small in the water repellent material because of leakage current, so that dielectric breakdown may be avoided, and the water repellent material almost does not function as a capacitor. Accordingly, the anodized portion and the water repellent material are not to form serial connection of capacitors, and only the anodized portion may be as a capacitor. Therefore, a total dielectric constant of the anodized portion and the water repellent material is a value of only the anodized portion, so that it is possible to avoid impairment of the aforementioned effect of low drive voltage.

[2] Second Embodiment

A varifocal lens according to an embodiment of the present invention as described above may be driven at significantly reduced voltage as compared with a varifocal lens of the related art, and therefore may be used for various optical devices in which a small varifocal lens may not used in the related art.

For example, the varifocal lens may be used as an aberration correcting element or a collimator lens having a variable magnification in an optical recording/reproduction device to perform recording and/or reproduction of various optical discs such as a CD (Compact Disc), DVD (Digital Versatile Disc), or BD (Blu-ray Disc®), and an optical pickup device for the optical recording/reproduction device.

In particular, in an optical recording/reproduction device using a multiple wavelength light source which is compatible to such various optical discs, it may be necessary to make a focal length of a collimator lens variable. A varifocal lens according to an embodiment of the present invention may be driven at significantly reduced voltage as described above, and therefore may be practically used for such an optical recording/reproduction device and an optical pickup device.

Figure 10:
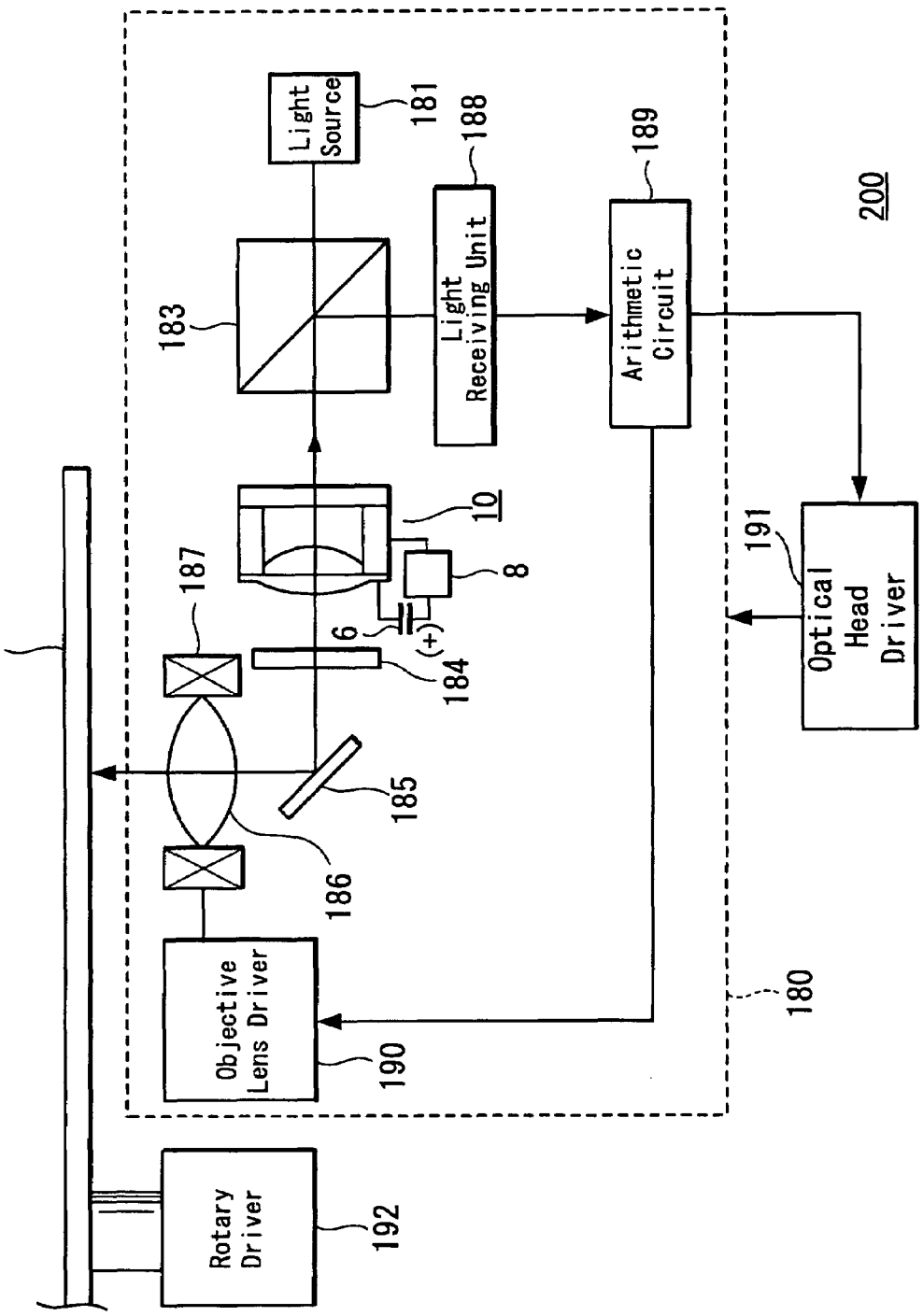
FIG. 10 is a schematic view of an example of an optical recording/reproduction device including an optical pickup device according to an embodiment of the present invention.

FIG. 10 shows a schematic view of a main part of an example of an optical recording/reproduction device including an optical pickup device using a varifocal lens according to an embodiment of the present invention.

The optical recording/reproduction device 200 includes: a light source 181 formed by a double wavelength semiconductor laser to emit double wavelength laser light; and an optical system to make the light emitted from the light source 181 incident to an optical recording medium 195, for example an optical disc. In this case, the optical system is formed by a polarization beam splitter 183, the varifocal lens 10, a quarter-wave plate 184, a mirror 185, an objective lens 186. The optical recording/reproduction device 200 also has an optical system to guide light reflected from the optical recording medium 195 to a light receiving unit 188. In this case, the optical system is formed by the objective lens 186, the mirror 185, the quarter-wave plate 184, the varifocal lens 10, and the polarization beam splitter 183. In the example shown in the figure, only the first and second liquid materials are shown for the varifocal lens and the electrodes of applying voltage to the first liquid material and the anodized portions are not shown; however, the varifocal lens 10 may have the aforementioned configuration shown in FIG. 5, 6, or 7. In the varifocal lens 10, the capacitor 6 is placed between the second electrode (not shown) and the voltage application unit 8.

An objective lens drive 190 having an actuator 187 such as a biaxial actuator is connected to the objective lens 186. The optical recording medium 195 is placed on and fixed to a rotary drive 192 such as a spindle motor and rotated at a predetermined speed in recording or reproduction.

A signal detected in the light receiving unit 188 is output to an arithmetic circuit 189. An optical pickup device 180 according to an embodiment of the present invention is shown in FIG. 10 with a dotted line.

In such a configuration, laser light, for example, emitted from the light source 181 is incident to the polarization beam splitter 183. The laser light passes through a plane of polarization of the polarization beam splitter 183, and then is collimated by the varifocal lens 10 with a focal length of the lens controlled. The laser light passes through the quarter-wave plate 184, is reflected from the mirror 185, and is incident to a recording track of the optical recording medium 195 through the objective lens 186.

The light reflected from the optical recording medium 195 passes through the quarter-wave plate 184 and the varifocal lens 10 through the objective lens 186 and the mirror 185. The light having passed through the quarter-wave plate twice has a polarizing direction converted, is reflected from the plane of polarization of the polarization beam splitter 183, and is incident to the light receiving surface of the light receiving unit 188.

Light output detected in the light receiving unit 188 is output to the arithmetic circuit 189, and an RF (radiofrequency) signal, a TE (tracking error) signal, and an FE (focus error) signal are operated in the arithmetic circuit 189, respectively. The RF signal is subjected to processing such as analog/digital conversion or error correction in the arithmetic circuit 189 and output as a recording/reproduction signal. The TE signal is output to an optical head drive 191 and/or the objective lens drive 190 and the FE signal is output to the objective lens drive 190 to perform focus servo and tracking servo.

A varifocal lens utilizing an electrowetting phenomenon is, as described above, advantageous in that: current is essentially not flown in the varifocal lens except when discharging, so that power consumption is extremely small; the varifocal lens has a life longer than that of a varifocal lens of the related art moved by a motor or the like, since the lens does not have a mechanical drive; and the varifocal lens may save space and provide an auto-focus mechanism, for example, with a simple configuration in various optical devices including such an optical pickup device, since the lens does not have to include a motor. A varifocal lens of the related art needs a booster circuit for practical use, since the lens is driven only at high voltage. However, a varifocal lens according to an embodiment of the present invention may be driven at a reduced voltage of about 10V or less to realize a desired change in spherical degree, so that the varifocal lens may be used for various devices without providing a booster circuit. Therefore, an electrowetting device such as a varifocal lens may be used having the aforementioned various advantages with a relatively simple circuit structure.

For example, a compatible optical recording/reproduction device in which recording and/or reproduction may be performed for two kinds of the optical recoding media 195 or an optical recording/reproduction device to perform recording and/or reproduction for a multi-layer recording medium, a relative position of a second group lens or the like is mechanically changed to control a focal length. However, when the varifocal lens 10 of the present embodiment is used instead of such a second group lens or the like, it is possible to provide the optical pickup device 180 and the optical recording/reproduction device 200 that may have a long life and save space, do not have to include a mechanical drive, and may be reduced in size, without providing a booster circuit. The varifocal lens 10 may be AC-driven and controlled with high precision by providing the capacitor 6, so that it is possible to suppress or avoid deterioration of optical recording/reproduction properties.

[3] Third Embodiment

An electrowetting device according to an embodiment of the present invention is not limited to an optical device through which light may pass such as the aforementioned varifocal lens, and may be used for various other devices utilizing a modification of a liquid material. Next, an example of a liquid operation device will be described as one example of the electrowetting device.

Development of microfluidic systems to perform predetermined treatment for a microsize continuous liquid flow is now in progress. There is a demand for development of microfluidic devices to realize sensors and analyzers called "chemistry-on-a-chip", in particular. Such sensors and analyzers are also known as "Labs-On-a-Chip" (LoC) and micrototal analysis systems (μ-TAS). Automated chip devices are formed using the microfluidic systems, so that it is possible to provide chemical (or biochemical) experimental instruments that may be operated at high speed and portable and are inexpensive and highly reliable. The instruments may be used for medical diagnosis, environmental monitoring, and basic science research, for example. Further, micromixer devices utilizing vibration by a piezoelectric element or electrophoresis are also proposed, for example, where movement of a microdroplet may be controlled with high precision by utilizing electrowetting phenomena.

FIG. 11 is a schematic cross-sectional view of a main part of an example of a droplet operation device according to an embodiment of the present invention to realize such a microfluidic device. In the droplet operation device 30, electrodes 23a, 23b, 23c, . . . 23i made of an anodizable valve metal such as aluminum, tantalum, niobium, hafnium, or titanium are arranged and formed on a substrate 21 made of an insulating material to form an electrode array 23. Anodized portions 24a, 24b, 24c, . . . 24i made of a metal oxide formed by anodizing the electrodes 23a, 23b, 23c, . . . 23i, respectively, and functioning as dielectric films are formed on a surface of the electrode array 23. A water repellent material 25 is attached to entirely cover the anodized portions 24a, 24b, 24c, . . . 24i. A common electrode 29 and a conductive water repellent material 28 on the common electrode 29 are attached to entirely cover another substrate 22.

The substrates 21 and 22 are placed such that the substrates 21 and 22 face inner surfaces of which the electrode array 23 and the common electrode 29 are formed. Between the substrates 21 and 22, a droplet 26 made of a conductive or polar material is placed in contact with the water repellent materials 25 and 28 on the substrates 21 and 22. An electrolytic solution such as salt water or an aqueous sodium sulfate ($Na_2SO_4$) solution, or an ionic liquid may be used for the droplet 26. An insulating material 27 made of a liquid such as silicone oil may be packed in a space around the droplet 26. A gas such as air may also be packed in the space.

A capacitor 33, a voltage application unit 31, and a voltage control unit 32 are connected to each other between the electrodes 23a, 23b, 23c, . . . 23i of the electrode array 23 and the common electrode 29 on the substrate 22. Switches Sa, Sb, Sc, . . . Si are placed between the voltage control unit 32 and the electrodes 23a, 23b, 23c, . . . 23i. In this case, the capacitor 33 is placed between the common electrode 29 and the voltage application unit 31, with an anode being connected to the voltage application unit 31 if a polar capacitor is used as the capacitor 33. The switches Sa, Sb, Sc, . . . Si may be controlled by the voltage control unit 32 or incorporated in the voltage control unit 32.

In such a configuration, voltage applied to the electrodes 23a, 23b, 23c, . . . 23i of the electrode array 23 is sequentially changed by the voltage control unit 32, so that the droplet 26 may be moved as indicated by an arrow a. This state will be described with reference to FIGS. 12A to 12C.

Figure 12A:
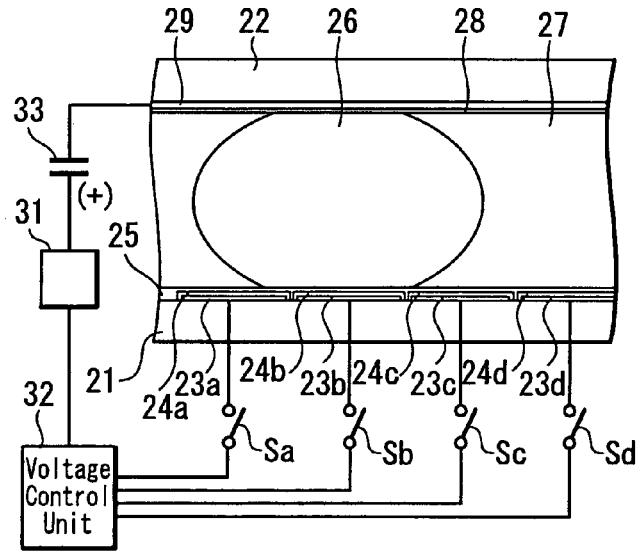
FIGS. 12A to 12C are schematic cross-sectional views describing a droplet operation in an example of a droplet operation device according to an embodiment of the present invention.
Figure 12B:
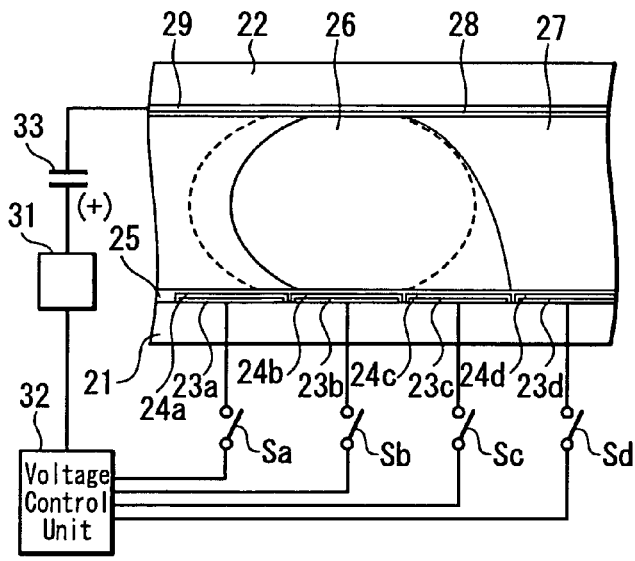
Figure 12C:
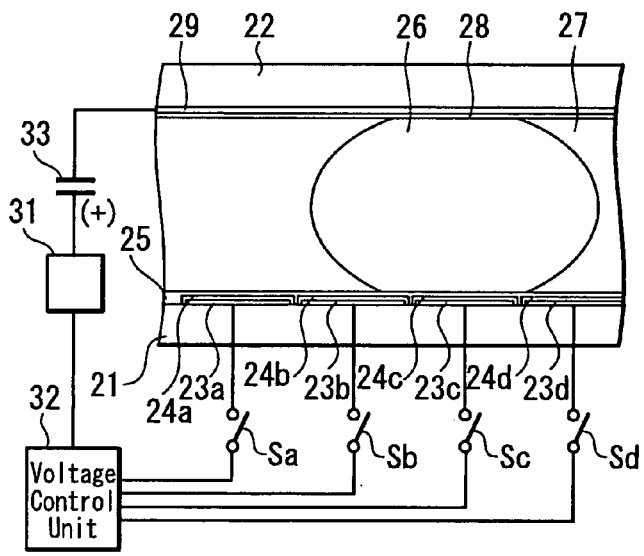

First, as shown in FIG. 12A, predetermined voltage is applied to the electrode 23b, for example. The common electrode 29 may be at a ground potential. Next, when the predetermined voltage is similarly applied to the adjacent other electrode 23c as shown in FIG. 12B, the droplet 26 has a widened contact area with the voltage applied electrodes (the electrodes 23b and 23c in this case) by an electrowetting phenomenon, and is eventually deformed to have a bottom surface extending to the electrode 24c as shown in the figure. Thereafter, as shown in FIG. 12C, the droplet 26 is moved onto the electrode 23c, when voltage applied to the electrode 23b is lowered, for example, to 0. Such voltage control allows the droplet 26 to be sequentially moved. In order to smoothly move the droplet 26 by applying voltage to such continuously adjacent electrodes, it may be necessary to select a volume of the droplet 26, an interval between the substrates 21 and 22, and a length in a movement direction of each electrode of the electrode array 23 appropriately, so that the bottom surface of the droplet 26 in a stable state is always brought into contact with two adjacent electrodes.

In the present embodiment, the anodized portions are formed as dielectric films on the electrodes of the electrode array 23 as described above, so that the droplet operation device may be produced by a simple method as in the aforementioned varifocal lens and the dielectric films may be thinner than a dielectric film formed by a vacuum thin film formation method of the related art. Accordingly, a thickness of the dielectric films may be reduced and a material having a higher dielectric constant may be easily used. Therefore, drive voltage to realize a desired change in shape, that is, to move the droplet may be considerably as compared with the related art. Since the dielectric films may be deposited precisely with a uniform thickness by a production method simpler than that of the related art, it is possible to suppress variability in deformation of the droplet caused by variability in film thickness and to control movement of the droplet more precisely. Further, when the base substrate 21 is made of an insulating substance, dielectric breakdown does not occur even if the valve metal films have some pinhole defects, and the defects are not of importance in practical use. Moreover, since dielectric breakdown does not occur until formation voltage, the anodized portions have a sufficiently high breakdown strength, advantageously.

In the present embodiment, the capacitor 33 is placed between the electrode array 23 and the common electrode 29, between the common electrode 29 and the voltage application unit 31 in this case, so that the device may be non-polarized and AC-driven and thus may be controlled with high precision.

In such a droplet operation device, as in the aforementioned varifocal lens, the water repellent material preferably has a sufficiently thin film thickness of 10 nm or less, for example about 5 nm. To deposit a thin film, it is preferable to use a reactive water repellent coating material such as a fluorinated silane coupling agent.

In the aforementioned embodiment, the conductive water repellent material 28 is attached onto the common electrode 29; however, the water repellent material 28 may be conductive having a sufficiently thin film thickness of 10 nm or less, for example about 5 nm. To deposit a thin film, it is similarly preferable to use a reactive water repellent coating material such as a fluorinated silane coupling agent.

[4] Fourth Embodiment

An electrowetting device according to an embodiment of the present invention may further be used as a small optical element having a diaphragm or shutter function in various optical devices such as a portable telephone with a camera function and a small camera, or an imaging device, in addition to the aforementioned optical pickup device or optical recording/reproduction device.

Figure 13A:
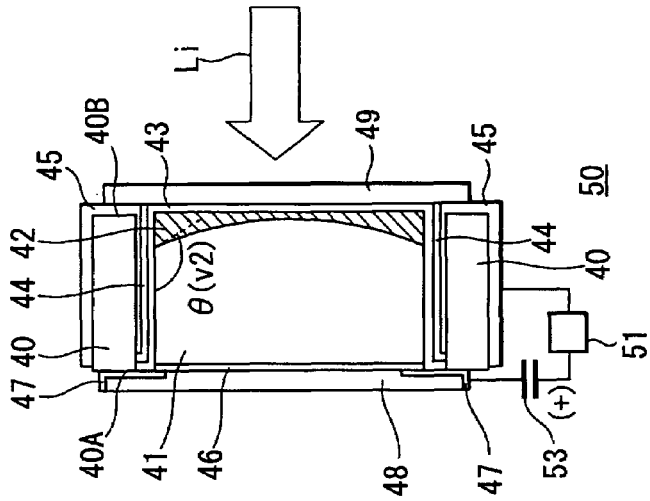
FIGS. 13A to 13C are schematic cross-sectional views of an example of an optical element according to an embodiment of the present invention.
Figure 13B:
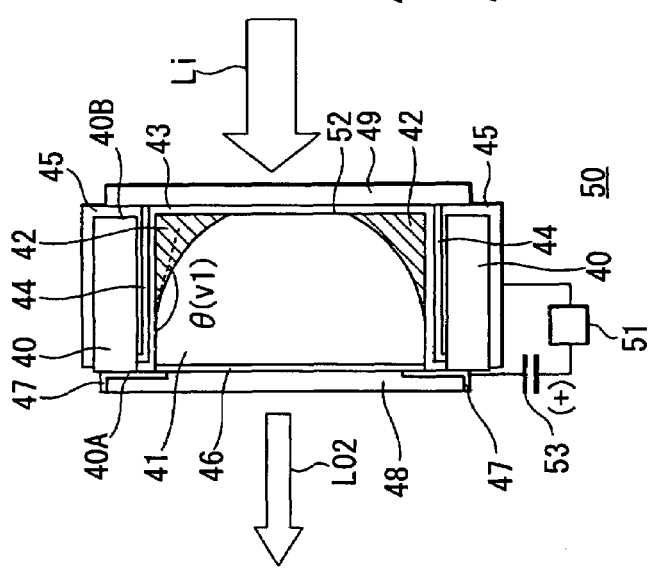
Figure 13C:
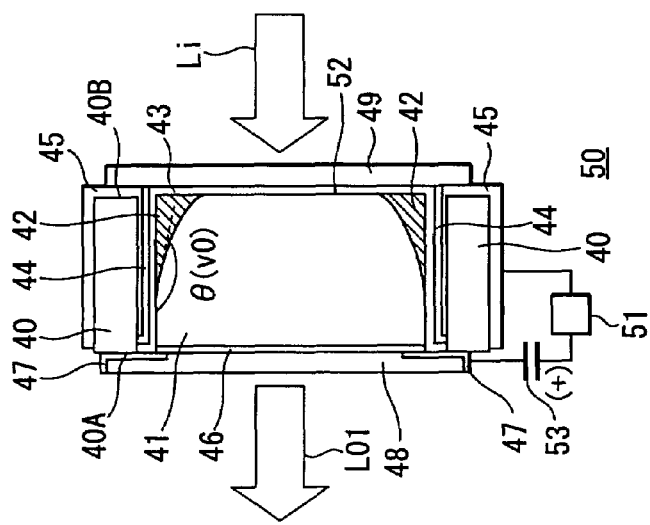

FIGS. 13A to 13C are schematic cross-sectional views of an example of an optical element according to an embodiment of the present invention. The optical element 50 includes: a container 40 having a cylindrical shape, for example, and made of an insulating material with edges 40A and 40B as both opening edges; a pair of light transmissive materials 48 and 49 to fluid-tightly seal the edges 40A and 40B; and a conductive or polar first liquid material 41 and an insulating second liquid material 42 stored between the light transmissive materials 48 and 49. An electrolytic solution such as salt water or an aqueous sodium sulfate ($Na_2SO_4$) solution, or an ionic liquid may be used for the first liquid material 41, and silicone oil may be used for the second liquid material 42, for example. A water repellent material 43 is attached to an inner periphery of the container 40 and an inner surface of the light transmissive material 49. First electrodes 45 to apply voltage to the first liquid material 41 through dielectric layers are each continuously formed on the inner periphery of the container 40 and the one edge 40B on a light transmissive material 49 side. Anodizable valve metals such as aluminum, tantalum, niobium, hafnium, and titanium may be used for the first electrodes 45. Anodized portions 44 made of a metal oxide by anodization are formed on part of surfaces of the first electrodes 45, on the inner periphery of the container 40 in the example shown in the figure, to function as dielectric films. Edges of the first electrodes 45 on the inner periphery are placed as separated from the other edge 40A of the container 40, and the anodized portions 44 and the water repellent material 43 is formed to cover surfaces of the edges.

Second electrodes 47 having a ring shape, for example, are placed between the edge 40A of the container 40 and an inner surface of the light transmissive material 48 placed on the edge 40A of the container 40. The second electrodes 47 are formed to extend on an outer periphery of the light transmissive material 48. The second electrodes 47 formed by a light transmissive conductive material may have a round shape, not a ring shape, for example. A hydrophilic material 46, also called a hydrophilic coating, is attached to cover inner surfaces of the second electrodes 47 and the light transmissive material 48. When the light transmissive material 48 is formed by glass and its inner surface is cleaned to be kept hydrophilic, the hydrophilic material 46 does not have to be present.

A voltage application unit 51 is connected to the first electrode 45 extending on an outer periphery on the edge 40B of the container 40 and to the second electrode 47 extending on an outer periphery of the light transmissive material 48 in order to apply voltage to the electrodes. Further, a capacitor 53 is placed between the first electrode 45 and the second electrode 47, between the second electrode 47 and the voltage application part 51 in this case, with an anode being connected to the voltage application unit 51 if a polar capacitor is used as the capacitor 53.

Here, any one of the first and second liquid materials 41 and 42 is made of a material having a light transmittance lower than that of the other liquid material. For example, a light transmittance of the second liquid material 42 is lower than that of the first liquid material 41. Specifically, a light absorptance or light transmittance of the second liquid material 42 is higher than that of the first liquid material 41 in a wavelength band of incident light Li. For example, a contact angle θ of the first liquid material 41 is large as shown in FIG. 13A at low voltage (for example, V=0). Here, as shown in the figure, the second liquid material 42 having a low light transmittance has a volume smaller than that of the first liquid material 41 and separated on a light transmissive material 49 side of the inner periphery of the container 40 to form an opening window 52. A considerable amount of outgoing light L01 from the incident light Li may pass the optical element 50.

When predetermined voltage is applied to the optical element 50 from the voltage application unit 51, a contact angle θ(v1) of the first liquid material 41 is smaller than θ0; an internal diameter of the second liquid material 42 pressed toward the inner periphery of the container 40 by the first liquid material 41 is reduced; and the opening window 52 is also reduced in size, as shown in FIG. 13B. A reduced amount of the incident light Li passes through the optical element 40, meaning that an amount of the outgoing light L02 is reduced. Moreover, when high voltage is applied by the voltage application 51, the optical element 50 is in a state shown in FIG. 13C. A contact angle θ(v2) of the first liquid material 41 is further smaller, so that an interface between the first liquid material 41 and the second liquid material 42 forms part of a spherical surface in the container 40. Accordingly, the opening window is shut to prevent passage of the incident light Li, in other words, a shutter is closed.

The optical element 50 having such a configuration may be provided with a diaphragm or shutter function having an approximately round opening by utilizing essentially rotationally symmetrical deformation of the first liquid material 41. A common diaphragm or shutter having an opening diameter changed by movement of a plurality of blade members may not have such a round opening and has a polygonal opening such as a hexagonal opening. Such an opening shape affects a soft focus state where a focus is intentionally shifted, for example; however, a soft focus state may be realized with a extremely approximately round opening using an optical element according to an embodiment of the present invention.

The optical element 50 in this case may exhibit the following effects, because the optical element has the anodized portions 44 made of a metal oxide formed by anodizing the first electrodes 45 as dielectric films between the first electrodes 45 and the first liquid material 41, as in the aforementioned varifocal lens and droplet operation device. Specifically, the optical element may be produced by a simple method using anodization and the dielectric films may be thinner than a dielectric film obtained by a vacuum thin film formation method of the related art. Accordingly, a thickness of the dielectric films may be reduced and a material having a higher dielectric constant may be easily used. Therefore, drive voltage to realize a desired change in shape of the interface between the liquid materials may be considerably as compared with the related art. Since the dielectric films may be deposited precisely with a uniform thickness by a production method simpler than that of the related art, it is possible to suppress variability in deformation of a shape of the interface caused by variability in film thickness and to control a diaphragm or shutter function more precisely. Further, when the base container 40 is made of an insulating substance, dielectric breakdown does not occur even if the first electrodes 45 made of valve metal films have some pinhole defects, and the defects are not of importance in practical use. Moreover, since dielectric breakdown does not occur until formation voltage, the anodized portions 44 have a sufficiently high breakdown strength, advantageously.

Further, the optical element 50 of the present embodiment may be non-polarized in its entirety and AC-driven, since the optical element 50 has the capacitor 53 in addition to the voltage application unit 51 between the first electrode 45 and the second electrode 47. Therefore, the optical device 50 may be controlled with high precision.

In such an optical element, as in the aforementioned varifocal lens and droplet operation device, the water repellent material preferably has a sufficiently thin film thickness of 10 nm or less, for example about 5 nm. To deposit a thin film, it is preferable to use a reactive water repellent coating material such as a fluorinated silane coupling agent.

[5] Fifth Embodiment

Next, there will be described an example of forming a zoom lens using a varifocal lens having the same configuration as in the aforementioned varifocal lens.

Figure 1A:
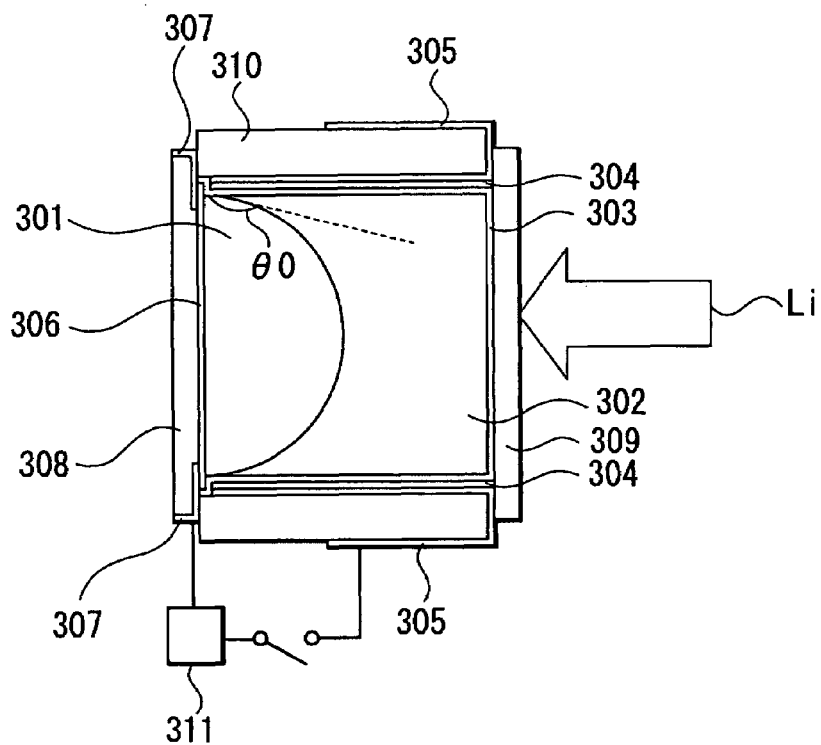
FIGS. 1A and 1B are schematic cross-sectional views of an example of a varifocal lens of the related art.
Figure 1B:
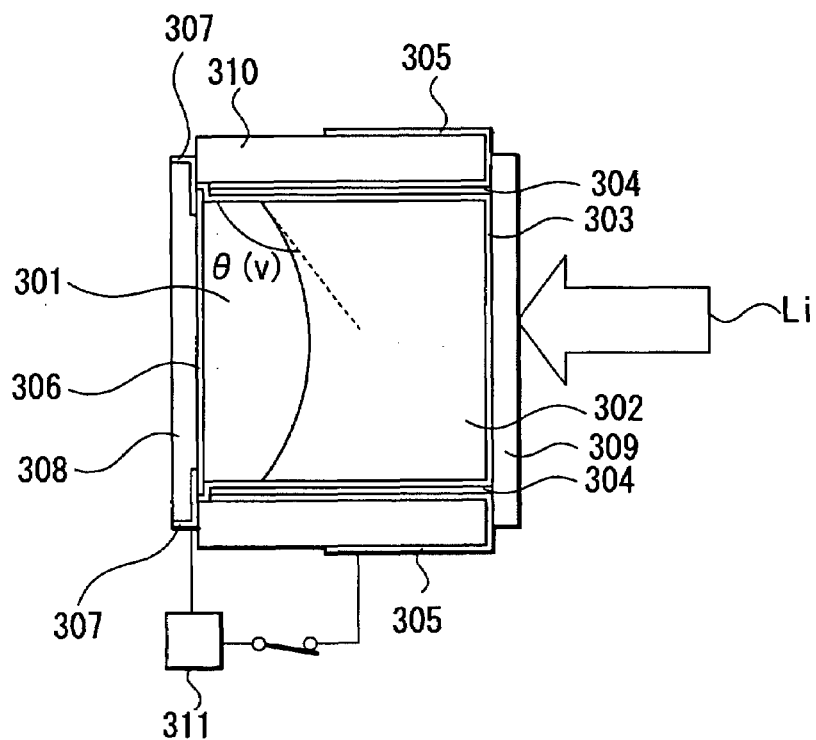
Figure 2:
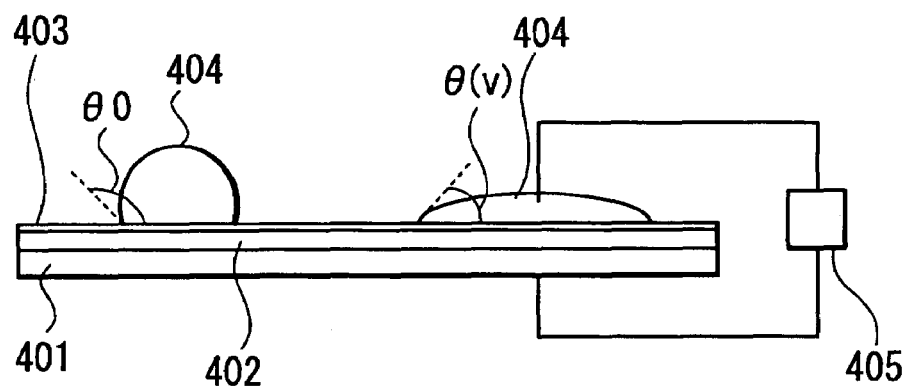
FIG. 2 is a view describing a change in contact angle in an electrowetting phenomenon.
Figure 3:
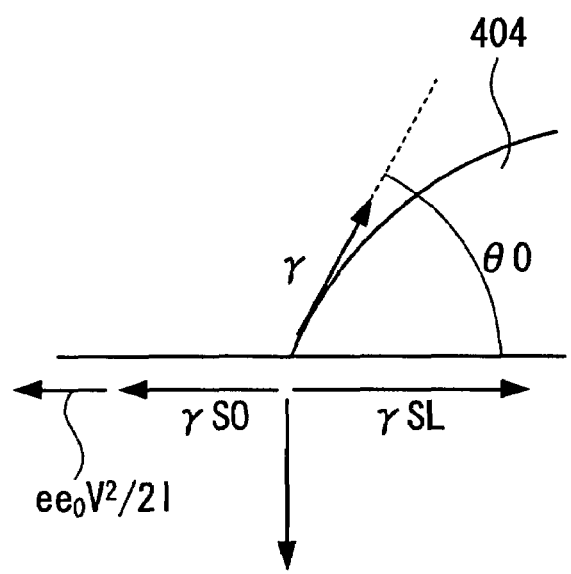
FIG. 3 is a view describing a principle of an electrowetting phenomenon.
Figure 14:
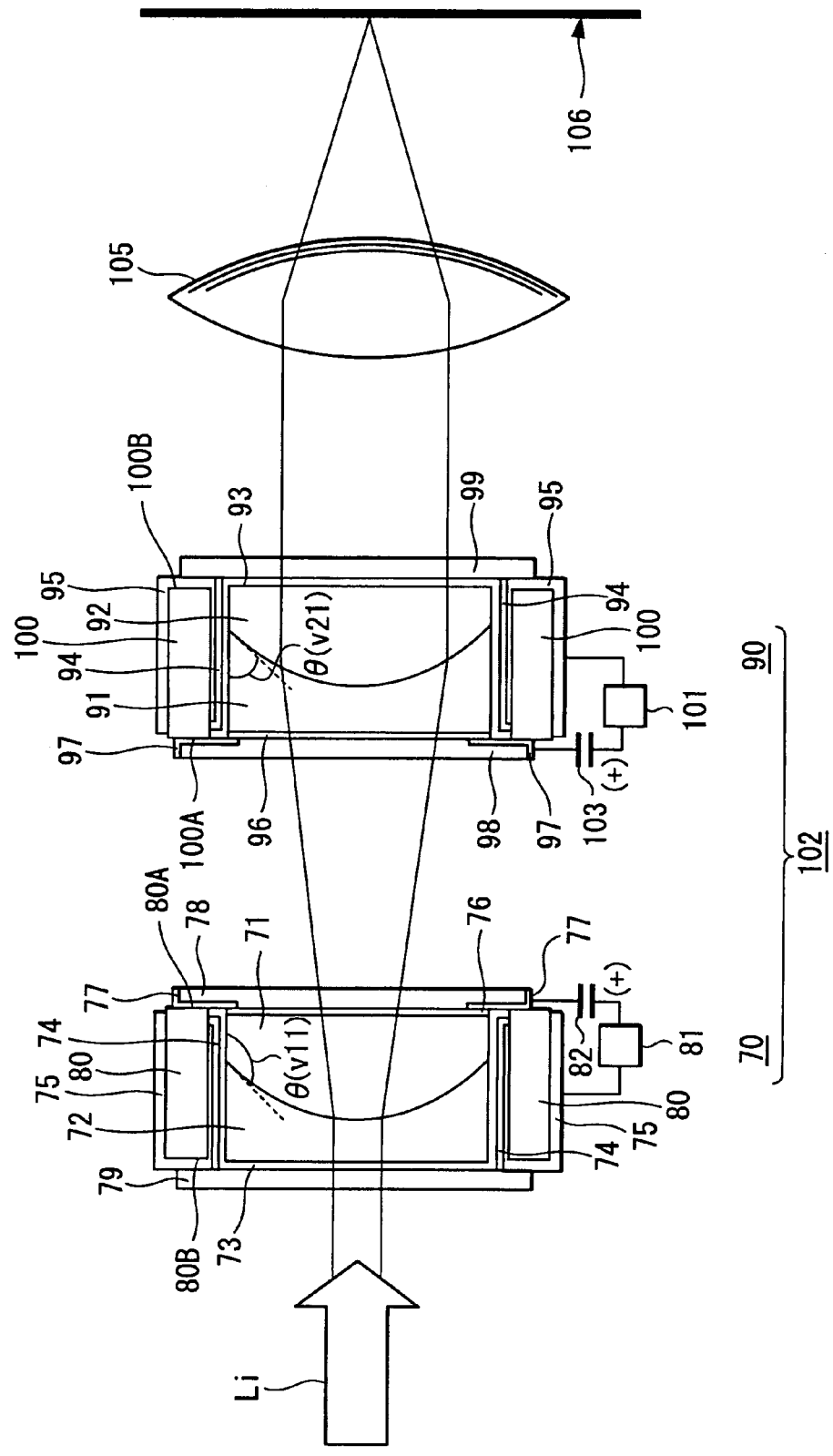
FIG. 14 is a schematic cross-sectional view of an example of a zoom lens according to an embodiment of the present invention.

FIG. 14 is a schematic cross-sectional view of an example of a zoom lens according to an embodiment of the present invention. As shown in FIG. 14, the zoom lens 102 has a pair of two varifocal lenses 70 and 90 having the same configuration as in the varifocal lens shown in FIGS. 2 to 4, for example. In the one varifocal lens 70, both opening edges of a container 80 having a cylindrical shape, for example, are fluid-tightly sealed by light transmissive materials 78 and 79 made of glass or the like, and a polar or conductive first material 71 and an insulating material 72 are stored in the container 80. A water repellent material 73 is attached to an inner periphery of the container 80 and an inner surface of the light transmissive material 79. First electrodes 75 to apply voltage to the first liquid material 71 through dielectric layers are each continuously formed on the inner periphery of the container 80 and one edge 80B on a light transmissive material 79 side. Anodized portions 74 made of a metal oxide by anodization are formed on part of surfaces of the first electrodes 75, on the inner periphery of the container 80 in the example shown in the figure, to function as dielectric films. Edges of the first electrodes 75 on the inner periphery are placed as separated from another edge BOA of the container 80, and the anodized portions 74 and the water repellent material 73 are formed to cover surfaces of the edges.

The shape of the container 40 may not be limited to cylindrical shape; however, may be a truncated cone shape; that is, conical shape excluding a tip.

Second electrodes 77 having a ring shape, for example, are placed between the edge 80A of the container 80 and an inner surface of the light transmissive material 78 placed on the edge 80A of the container 80. The second electrodes 77 are formed to extend on an outer periphery of the light transmissive material 78. The second electrodes 77 formed by a light transmissive conductive material may have a round shape, not a ring shape, for example. A hydrophilic material 76, also called a hydrophilic coating, is attached to cover inner side surfaces of the second electrodes 77 and the light transmissive material 78. When the light transmissive material 78 is formed by glass and its inner surface is cleaned to be kept hydrophilic, the hydrophilic material 76 does not have to be present.

A voltage application unit 81 is connected to the first electrode 75 extending on an outer periphery on the edge 80B of the container 80 and to the second electrode 77 extending on an outer periphery of the light transmissive material 78 in order to apply voltage to the electrodes. The varifocal lens 70 is formed in this manner. Further, a capacitor 82 is placed between the first electrode 75 and the second electrode 77, between the second electrode 77 and the voltage application unit 81 in this case, with an anode being connected to the voltage application unit 81 if a polar capacitor is used as the capacitor 82.

In the other varifocal lens 90, both opening edges of a container 100 having a cylindrical shape, for example, are fluid-tightly sealed by light transmissive materials 98 and 99 made of glass or the like, and a polar or conductive first material 91 and an insulating material 92 are stored in the container 80. A water repellent material 93 is attached to an inner periphery of the container 100 and an inner surface of the light transmissive material 99. First electrodes 95 to apply voltage to the first liquid material 91 through dielectric layers are each continuously formed on the inner periphery of the container 90 and one edge 100B on a light transmissive material 99 side. Anodized portions 94 made of a metal oxide by anodization are formed on part of surfaces of the first electrodes 95, on the inner periphery of the container 100 in the example shown in the figure, to function as dielectric films. Edges of the first electrodes 95 on the inner periphery are placed as separated from another edge 100A of the container 100, and the anodized portions 94 and the water repellent material 93 are formed to cover surfaces of the edges.

Second electrodes 97 having a ring shape, for example, are placed between the edge 100A of the container 100 and an inner surface of the light transmissive material 98 placed on the edge 100A of the container 100. The second electrodes 97 are formed to extend on an outer periphery of the light transmissive material 98. The second electrodes 97 formed by a light transmissive conductive material may have a round shape, not a ring shape, for example. A hydrophilic material 96, also called a hydrophilic coating, is attached to cover inner surfaces of the second electrodes 97 and the light transmissive material 98. When the light transmissive material 98 is formed by glass and its inner surface is cleaned to be kept hydrophilic, the hydrophilic material 96 does not have to be present.

A voltage application unit 101 is connected to the first electrode 95 extending on an outer periphery on the edge 100B of the container 100 and to the second electrode 97 extending on an outer periphery of the light transmissive material 98 in order to apply voltage to the electrodes. The varifocal lens 90 is formed in this manner. Further, a capacitor 103 is placed between the first electrode 95 and the second electrode 97, between the second electrode 97 and the voltage application unit 101 in this case, with an anode being connected to the voltage application unit 101 if a polar capacitor is used as the capacitor 103.

In the two varifocal lenses 70 and 90, an electrolytic solution such as salt water or an aqueous sodium sulfate ($Na_2SO_4$) solution, or an ionic liquid may be used for the first liquid materials 71 and 91, and silicone oil may be used for the second liquid materials 72 and 92, for example. Anodizable valve metals such as aluminum, tantalum, niobium, hafnium, and titanium may be used for the anodizable first electrodes 75 and 95.

The two varifocal lenses 70 and 90 are provided in this manner, so that the lenses 70 and 90 include one interface between the first liquid material 71 and the second liquid material 72 and one interface between the first liquid material 91 and the second liquid material 92, respectively, and in other words, two interfaces between the first liquid materials and the second liquid materials in total.

In this example, a material for the first liquid material is selected to have a refractive index smaller than that of the second liquid material in each of the varifocal lenses 70 and 90, and the first liquid materials are placed on inner sides of the varifocal lenses 70 and 90 to face each other. FIG. 14 shows a state where the first liquid material 71 of the varifocal lens 70 has a convex lens shape and the first liquid material 91 of the varifocal lens 90 has a concave lens shape.

Figure 15:
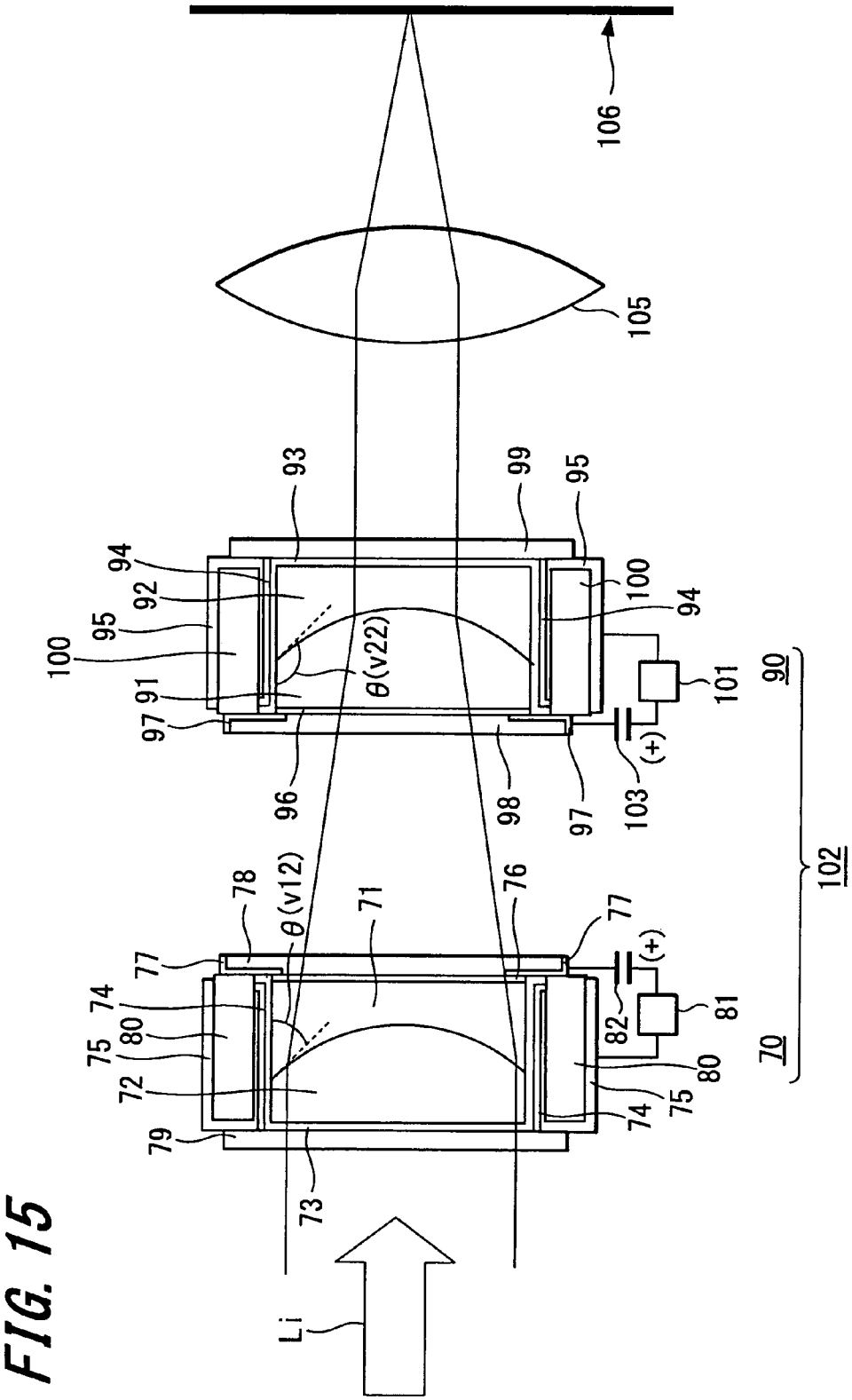
FIG. 15 is a schematic cross-sectional view of an example of a zoom lens according to an embodiment of the present invention.

FIG. 15 shows a state where voltage applied to each of the varifocal lenses 70 and 90 is changed. In FIG. 15, parts corresponding to those of FIG. 14 are indicated by the same symbols, and repeated description is omitted. FIG. 15 shows a state where the first liquid material 71 of the varifocal lens 70 has a concave lens shape and the first liquid material 91 of the varifocal lens 90 has a convex lens shape. Specifically, in this case, in the state shown in FIG. 14, voltage V11 applied from the voltage application unit 81 is set to be relatively low (for example, V=0) in the varifocal lens 70, and voltage V21 applied from the voltage application unit 101 is set to be relatively high in the varifocal lens 90. In the state shown in FIG. 15, voltage V11 applied from the voltage application unit 81 is set to be relatively high in the varifocal lens 70, and voltage V21 applied from the voltage application unit 101 is set to be relatively low (for example, V=0) in the varifocal lens 90. Accordingly, a contact angle θ (V11) of the first liquid material 71 of the varifocal lens 70 is relatively large in the state shown in FIG. 14, and a contact angle θ (V12) of the first liquid material 71 is relatively small in the state shown in FIG. 15. On the other hand, a contact angle θ (V21) of the first liquid material 91 of the varifocal lens 90 is relatively large in the state shown in FIG. 14, and a contact angle θ (V22) of the first liquid material 91 is relatively small in the state shown in FIG. 15.

In such a configuration in the state shown in FIG. 14, when incident light Li is incident from the light transmissive material 79 of the varifocal lens 70, the light is emitted from the concave varifocal lens 70 as a divergent beam of light and emitted from the convex varifocal lens 90 as wide parallel light. The light emitted from the varifocal lens 90 forms an image on an imaging plane 106 by an optical lens 105 provided on an emission side of the varifocal lens 90. On the other hand, in the state shown in FIG. 15, incident light Li passes through the convex varifocal lens 70 as a convergent beam of light and passes through and emitted from the concave varifocal lens 90 as narrow parallel light, for example. In this case, the light also forms an image on the imaging plane 106 by the optical lens 105 provided on the emission side of the varifocal lens 90.

Voltage applied to the first and second electrodes of each of the varifocal lenses 70 and 90 is controlled to control a focal length of each lens in this manner, so that a wide angle lens may be formed in the state shown in FIG. 14 and a telephoto lens may be formed in the state shown in FIG. 15, for example, that is, a magnification may be accurately controlled.

The zoom lens 102 in this case may also exhibit the following effects, because the zoom lens has the anodized portions made of a metal oxide formed by anodizing the first electrodes as dielectric films between the first electrodes and the first liquid material, as in the aforementioned varifocal lens, droplet operation device, and optical element. Specifically, the zoom lens may be produced by a simple method using anodization and the dielectric films may be thinner than a dielectric film obtained by a vacuum thin film formation method of the related art. Accordingly, a thickness of the dielectric films may be reduced and a material having a higher dielectric constant may be easily used. Therefore, drive voltage to realize a desired change in shape of the interface between the liquid materials may be considerably as compared with the related art. Since the dielectric films may be deposited precisely with a uniform thickness by a production method simpler than that of the related art, it is possible to suppress variability in deformation of a shape of the interface caused by variability in film thickness and to control a focal length of each of the varifocal lenses more precisely. Further, when the base container is made of an insulating substance, dielectric breakdown does not occur even if the first electrodes made of valve metal films have some pinhole defects, and the defects are not of importance in practical use. Moreover, since dielectric breakdown does not occur until formation voltage, the anodized portions have a sufficiently high breakdown strength, advantageously.

In the present embodiment, since the capacitors 82 and 103 are placed in the varifocal lenses 70 and 90, respectively, the varifocal lenses 70 and 90 may be non-polarized and AC-driven, and therefore may be controlled with high precision.

In such a zoom lens, as in the aforementioned varifocal lens, droplet operation device, and optical element, the water repellent material preferably has a sufficiently thin film thickness of 10 nm or less, for example about 5 nm. To deposit a thin film, it is preferable to use a reactive water repellent coating material such as a fluorinated silane coupling agent.

In the aforementioned example, two varifocal lenses according to an embodiment of the present invention are combined to form a zoom lens; however, it is also possible to form two or more interfaces between first and second liquid materials by combining three or more such varifocal lenses. Two interfaces may also be formed in one container. In this case, conductive or polar liquid materials are respectively placed on both opening edges of a container having a cylindrical shape, for example, and an insulating liquid material is present between the conductive or polar liquid materials. Electrodes to apply voltage to the conductive or polar liquid materials on both edges may be separated so that voltage may be independently controlled for each electrode. In this case, anodized portions are similarly provided by anodizing surfaces of the electrodes as dielectric films between the conductive or polar liquid materials and the electrodes, so that drive voltage may be lowered; the dielectric films may be easily produced; a film thickness may be uniform; generation of defects may be avoided; and a breakdown strength may be increased, for example. Further, the zoom lens may be non-polarized in its entirety and AC-driven, and thus may be controlled with high precision, since the zoom lens has capacitors.

The shape of the containers 80 and/or 90 may not be limited to cylindrical shape; however, may be a truncated cone shape; that is, conical shape excluding a tip.

[6] Sixth Embodiment

Figure 16:
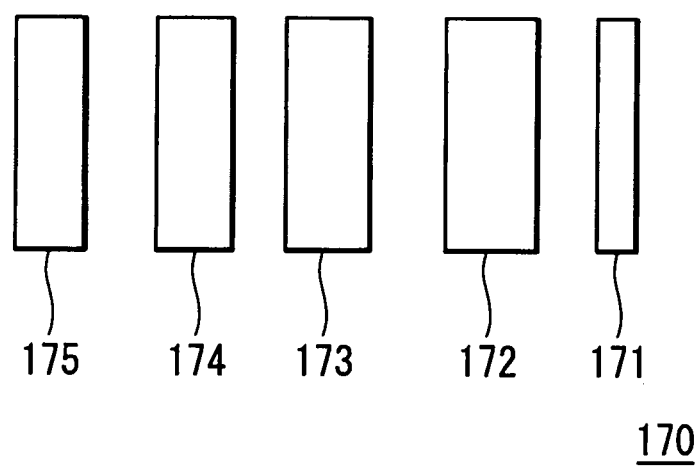
FIG. 16 is a schematic view of an example of an imaging device according to an embodiment of the present invention.

Next, an example of an imaging device according to an embodiment of the present invention will be described with reference to a schematic view of FIG. 16. The imaging device 170 includes a zoom lens 171, a diaphragm 172, a focus lens 173, a shutter 174, and a solid imaging element 175. It is possible to use, as the solid imaging element 175, a CCD (Charge Coupled Device), a CMOS (Complementary Metal Oxide Semiconductor) device, or the like including a plurality of photoelectric conversion units of converting energy of irradiated light into charges; a charge accumulation unit of accumulating the charges; and a charge transfer unit of transferring the charges to outside.

Here, at least one of the zoom lens 171, the diaphragm 172, the focus lens 173, and the shutter 174 is formed using a varifocal lens according to an embodiment of the present invention described in the first embodiment, an optical element according to an embodiment of the present invention having a diaphragm or shutter function described in the third embodiment, or a zoom lens according to an embodiment of the present invention described in the fourth embodiment.

Specifically, at least one of the zoom lens 171, the diaphragm 172, the focus lens 173, and the shutter 174 includes a pair of light transmissive materials; and a conductive or polar first liquid material and an insulating second liquid material, both stored between the light transmissive materials, and includes first electrodes of applying voltage to the first liquid material through dielectric layers; and second electrodes conducted to the first liquid material. The dielectric layers are formed as anodized portions made of a metal oxide formed by anodizing the first electrodes.

The anodized portions made of a metal oxide formed by anodizing the first electrodes are used as dielectric films between the first electrodes and the first liquid material, so that each portion may be produced by a simple method and drive voltage may be considerably reduced as compared with the related art. The zoom lens, diaphragm, focus lens, and shutter may be controlled with higher precision than before. Further, when a container forming the first electrodes is formed by an insulating substance, an effect of pinhole defects may be avoided and the dielectric films may be formed with a sufficiently high breakdown strength.

In the present embodiment, the zoom lens, diaphragm, focus lens, or shutter may be non-polarized and AC-driven, and thus may be surely controlled with high precision, since it has a capacitor.

In this case, a water repellent material attached onto the anodized portions in the zoom lens, diaphragm, focus lens, or shutter preferably has a sufficiently thin film thickness of 10 nm or less, for example about 5 nm. To deposit a thin film, it is preferable to use a reactive water repellent coating material such as a fluorinated silane coupling agent.

[7] Seventh Embodiment

Figure 17:
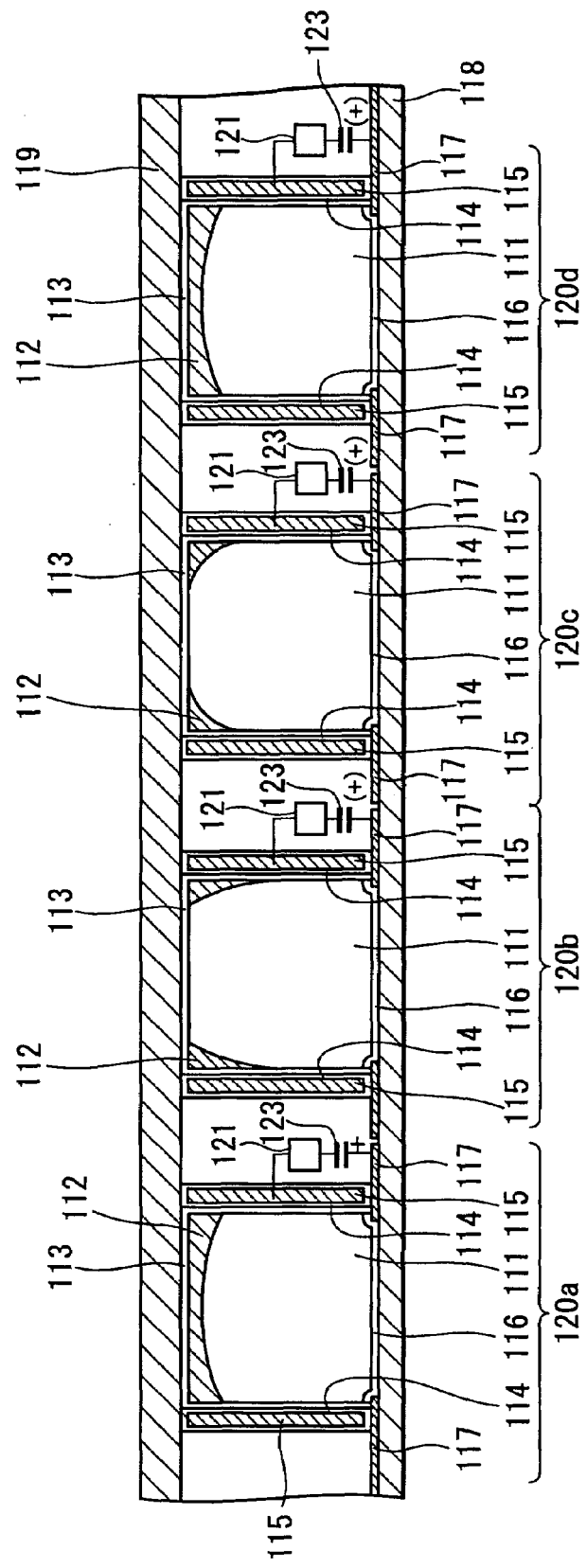
FIG. 17 is a schematic cross-sectional view of a main part in an example of a light modulating device according to an embodiment of the present invention.

Next, an embodiment of a light modulating device formed using an electrowetting device according to an embodiment of the present invention will be described. FIG. 17 is a schematic cross-sectional view of a main part in an example of a light modulating device according to an embodiment of the present invention. The light modulating device 130 is formed by, for example, two-dimensionally arranging in parallel light modulating elements 120a, 120b, . . . having the same configuration as in the optical element having a shutter function according to the aforementioned embodiment. As shown in FIG. 17, in the light modulating device 130, a plurality of first electrodes 115 also used as a container having a cylindrical shape, for example, and each forming the light, modulating element 120a, 120b, 120c, 120d, . . . are placed between a pair of flat light transmissive materials 118 and 119. FIG. 17 shows a cross-section where the first electrodes 115 are arranged in one direction; however, the electrodes 115 may be similarly arranged in a direction perpendicular to FIG. 17 on paper and thus two-dimensionally arranged in parallel. Anodizable valve metals such as aluminum, tantalum, niobium, hafnium, and titanium may be used for the first electrodes 115. The first electrodes 115 may be attached to and formed on part of a cylindrical container made of an insulating member, for example. In this case, a conductive or polar first liquid material 111 and an insulating second liquid material 112 are stored in the container. Any one of the first and second liquid materials 111 and 112, the second liquid material 112 in the example shown in the figure, is made of a material having a light transmittance lower than that of the first liquid material 111. The second liquid material 112 is injected on a light transmissive material 119 side. An electrolytic solution such as salt water or an aqueous sodium sulfate ($Na_2SO_4$) solution, or an ionic liquid may be used for the first liquid material 111, and silicone oil may be used for the second liquid material 112, for example.

In this case, whole surfaces of the first electrodes 115 form anodized portions 114 made of a metal oxide formed by anodization.

Opening edges of the first electrodes 115 on one side having a cylindrical shape, for example, are sealed by the light transmissive material 119 using an epoxy resin or the like, and a water repellent material 113 is attached onto inner surfaces of the first electrodes 115 and an inner surface of the light transmissive material 119. Opening edges of the first electrodes 115 on the other side are sealed by the light transmissive material 118 through a hydrophilic material 116 and second electrodes 117 having a ring shape, for example. An inside of the first electrodes 118 is fluid-tightly maintained in this manner. Specifically, the light modulating device 130 includes the first electrodes 115 of applying voltage to the first liquid materials 111 through dielectric layers formed by the anodized portions 114, and the second electrodes 117 conducted to the first liquid materials 111.

Voltage application units 121 of applying voltage to the first and second electrodes are placed between the light transmissive materials 118 and 119. Alternatively, a conductive member is drawn from each of the electrodes 115 and 117 and placed outside the light transmissive materials 118 and 119. In the example shown in the figure, the voltage application units 121 are provided between the light transmissive materials 118 and 119. Capacitors 123 are each placed between the first electrode 115 and the second electrode 117, between the second electrode 117 and the voltage application unit 121 in this case, with an anode being connected to the voltage application unit 121 if a polar capacitors are used as the capacitors 123.

A control unit (not shown) of modulating voltage applied to each of the light modulating elements 120a, 120b, . . . corresponding to a signal of information such as images or characters is connected to each of the voltage application units 121, so that voltage applied is controlled. For example, it is possible to use, as the light transmissive material 118, an active element array substrate used in a liquid crystal display device of the related art and having a switching active element such as a TFT (Thin Film Transistor) and pixel electrodes, scanning lines, and signal lines connected to the switching active element, which are provided in matrix. Appropriate voltage may be applied to each electrode corresponding to image information, character information, or the like by selecting a scanning line and a signal line.

In such a configuration, a shape of an interface between the first liquid material 111 and the second liquid material 112 is changed by controlling voltage applied to the first and second electrodes 115 and 117, so that the light modulating element 130 is formed in which an amount of light transmitted through the first and second liquid materials 111 and 112 is controlled corresponding to an input information signal.

More specifically, when relatively high voltage is applied to the first and second electrodes 115 and 117, a contact angle of the first liquid material 111 is relatively small; an interface between the first liquid material 111 and the second liquid material 112 maintains a partially spherical shape; and the second liquid material 112 having a lower light transmittance forms one film and light having passed through the second liquid material 112 is shielded. This state is shown as the light modulating elements 120a and 120d.

When voltage applied to the first and second electrodes 115 and 117 is relatively low, a contact angle of the first liquid material 111 is large. Accordingly, the second liquid material 112 is pressed toward edges by the first liquid material 111 and is deformed in a ring shape, and thus an opening is formed in a center and light is partially passed through the opening. This state is shown as the light modulating elements 120b and 120c.

Voltage applied to the first and second electrodes 115 and 117 is controlled in this manner, so that it is possible to control a degree in which the second liquid material 112 is pressed toward side surfaces, specifically, inner surfaces of the first electrodes 115, that is, a size of the opening. Accordingly, it is possible to control an amount of light passing through each of the light modulating elements 120a, 120b, 120c, . . . by controlling voltage applied to the light modulating element corresponding to information. Each of the light modulating elements 120a, 120b, 120c, . . . is formed for one pixel, so that it is possible to form the light modulating device 130 that may be used for a display device.

The light modulating device of the present embodiment may also exhibit the following effects, because the light modulating device has the anodized portions 114 as dielectric films attached onto the first electrodes 115, as in the electrowetting device such as the varifocal lens described in each of the aforementioned examples. That is, the dielectric films may be simply produced, and drive voltage may be considerably reduced as compared with the related art. The light modulating element may be controlled with higher precision than before. Further, when the first electrodes are also used as a container as described above or a container forming the first electrodes is formed by an insulating substance, an effect of pinhole defects may be avoided and the dielectric films may be formed with a sufficiently high breakdown strength.

In particular, each of the light modulating elements 120a, 120b, . . . may be non-polarized and thus AC-driven and controlled with high precision, since the light modulating element has a capacitor 123 in addition to the voltage application unit 121 between the first electrode 115 and the second electrode 117.

In this case, the water repellent material attached onto the anodized portions 114 preferably has a sufficiently thin film thickness of 10 nm or less, for example about 5 nm. To deposit a thin film, it is preferable to use a reactive water repellent coating material such as a fluorinated silane coupling agent.

[8] Eighth Embodiment

Figure 18:
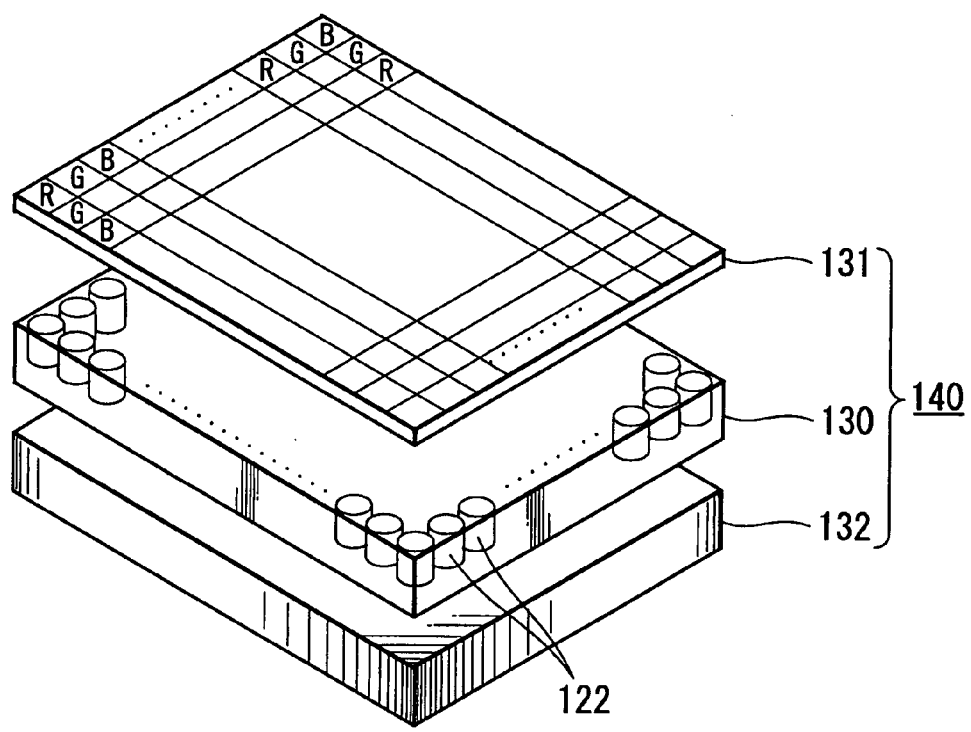
FIG. 18 is a schematic exploded perspective view of an example of a display device according to an embodiment of the present invention.

Next, an example of a display device according to an embodiment of the present invention will be described with reference to a schematic exploded perspective view of FIG. 18. As shown in FIG. 18, in this case, the display device 140 is formed using the light modulating device 130 having a configuration described in the aforementioned fifth embodiment, the light modulating device 130 having light modulating elements 122 each arranged corresponding to a pixel. A light source device 132 is placed on a rear surface of the light modulating device 130 and a color filter 131 is placed on a front surface of the light modulating device 130, for example. The color filter 131 is divided into a plurality of segments each corresponding to each pixel, that is, each of the light modulating elements 122. For example, the color filter 131 is divided into segments of three primary colors, specifically, red filters (R), green filters (G), and blue filters (B). Segments each corresponding to a light modulating element 122 may be arranged in the color filter 131 in a tetragonal lattice shape shown in FIG. 18 or in a stripe or delta shape (not shown), for example. It is also possible to place an optical sheet group (not shown) having a function to compensate phase difference between light waves to widen a view angle or prevent coloring, a function to diffuse incident light, and a function to improve luminance on a light emission side surface of the light source device 132, for example.

The display device 140 may also be formed as a monochrome display device without providing the color filter 131.

In a display device according to an embodiment of the present invention having such a configuration, since an electrowetting device is used for a light modulating device and dielectric films provided between a first liquid material and first electrodes of the electrowetting device are formed by anodized portions, the light modulating device may be produced simply and drive voltage may be significantly reduced, as in the aforementioned embodiments. Light modulating elements may be controlled with higher precision than before, gradation may be controlled with higher precision than before, and a display device may be provided with excellent display properties. Further, when the first electrodes are also used as a container or a container forming the first electrodes is formed by an insulating substance, an effect of pinhole defects may be avoided and the dielectric films may be formed with a sufficiently high breakdown strength.

Moreover, the light modulating elements may be AC-driven and controlled with high precision, since each of the light modulating elements has a capacitor as described above. Therefore, a display device may be provided with more excellent gradation control.

In this case, a water repellent material 113 attached onto the anodized portions 114 preferably has a sufficiently thin film thickness of 10 nm or less, for example about 5 nm. To deposit a thin film, it is preferable to use a reactive water repellent coating material such as a fluorinated silane coupling agent.

A varifocal lens, a droplet operation device, an optical element having a diaphragm or shutter function, a zoom lens, a light modulating device, and a display device using an electrowetting device according to an embodiment of the present invention are as described above; however, an electrowetting device according to an embodiment of the present invention is not limited to examples described in the aforementioned embodiments and may be used for various other devices utilizing electrowetting phenomena.

For example, the electrowetting device may be used for various optical devices using a varifocal lens such as optical measuring devices and optical reading devices. The electrowetting device may also be used for an optical switching element to control a polarizing direction of light, the optical switching element having any one of first and second liquid materials made of a light transmissive material and the other liquid material made of a material having a high reflectance.

The electrowetting device may also be used for a fluid jet device of jetting a liquid utilizing a change in surface shape of a liquid material and an ink jet printer using the same.

Further, an electrowetting device according to an embodiment of the present invention may be used for microdroplet mixers utilizing electrowetting phenomena and various chemical measuring devices and biochemical measuring devices using the same.

The electrowetting device may also provide a control device having a goniometer function, for example, where a position of a plate-like member, for example, placed on an upper surface of a droplet is controlled utilizing a change in height (thickness) of the droplet caused by a change in surface shape of the droplet.

Any of the devices utilizing electrowetting phenomena and using an electrowetting device according to an embodiment of the present invention may exhibit the same effect as in the aforementioned embodiments. Specifically, an anodized portion formed by anodization is used as a dielectric film, so that the device may be easily produced and driven at reduced voltage. A shape of an interface between liquid materials may be controlled with higher precision than before. Further, when a first electrode is also used as a container or a container forming the first electrode is formed by an insulating substance, an effect of pinhole defects may be avoided and the dielectric film may be formed with a sufficiently high breakdown strength.

A capacitor is particularly placed in addition to a voltage application unit between an electrode and a liquid material, so that the electrowetting device may be AC-driven, making it possible to avoid a gradual reduction in the effect of electrowetting phenomenon. Therefore, the electrowetting device may be surely controlled with high precision, advantageously.

In any case, a water repellent material attached onto the anodized portion preferably has a sufficiently thin film thickness of 10 nm or less, for example about 5 nm. To deposit a thin film, it is preferable to use a reactive water repellent coating material such as a fluorinated silane coupling agent.

A varifocal lens according to an embodiment of the present invention is not limited to each of the aforementioned embodiments, and it should be understood that various changes and modifications could be effected without departing from the spirit or scope of the present invention in terms of materials or configurations, for example.

It should be understood by those skilled in the art that various modifications, combinations, sub-combinations and alterations may occur depending on design requirements and other factors insofar as they are within the scope of the appended claims or the equivalents thereof.

What is claimed is:

1. An electrowetting device comprising:
a conductive or polar liquid material; and
an electrode applying voltage to the liquid material through a dielectric layer, wherein
the dielectric layer is formed as an anodized portion made of a metal oxide formed by anodizing the electrode, and
a voltage applying unit applying voltage between the electrode and the liquid material, and a polar capacitor are placed between the electrode and the liquid material.

2. The electrowetting device according to claim 1, further comprising:
a water repellent material between the dielectric layer and the liquid material.

3. The electrowetting device according to claim 1, wherein the capacitor is a polar capacitor.

4. A varifocal lens comprising:
a pair of light transmissive materials;
a conductive or polar first liquid material and an insulating second liquid material, both stored between the light transmissive materials;
a first electrode applying voltage to the first liquid material through a dielectric layer; and
a second electrode conducted to the first liquid material, wherein
the dielectric layer is formed as an anodized portion made of a metal oxide formed by anodizing the first electrode, and a voltage applying unit applying voltage between the first electrode and the second electrode and a capacitor are placed between the first electrode and the second electrode.

5. The varifocal lens according to claim 4, wherein at least one of the pair of light transmissive materials has a shape with a curved surface.

6. The varifocal lens according to claim 4, wherein an array lens includes a plurality of the varifocal lenses.

7. The varifocal lens according to claim 4, wherein the capacitor is a polar capacitor.

8. An optical pickup device comprising:
a light source;
a light receiving unit;
an objective lens facing an optical recording medium; and
an optical system having functions to guide outgoing light from the light source to the objective lens and to focus rays of light from the objective lens on the light receiving unit by a focusing lens, wherein
a predetermined position of the light recording medium is irradiated with light from the light source,
the optical system has a varifocal lens,
the varifocal lens includes a pair of light transmissive materials; and a conductive or polar first liquid material and an insulating second liquid material, both stored between the light transmissive materials, and includes a first electrode applying voltage to the first liquid material through a dielectric layer; and a second electrode conducted to the first liquid material, and the dielectric layer is formed as an anodized portion made of a metal oxide formed by anodizing the first electrode.

9. The optical pickup device according to claim 8, further comprising:

a voltage applying unit applying voltage between the first electrode and the second electrode, and a capacitor, both placed between the first electrode and the second electrode.

10. The optical pickup according to claim 9, wherein the capacitor is a polar capacitor.

11. An optical recording/reproduction device comprising:
a light source; a light receiving unit;
an objective lens facing an optical recording medium; and
an optical system having functions to guide outgoing light from the light source to the objective lens and to focus rays of light from the objective lens on the light receiving unit by a focusing lens, wherein
a predetermined position of the light recording medium is irradiated with light from the light source,
the optical system has a varifocal lens,
the varifocal lens includes a pair of light transmissive materials; and a conductive or polar first liquid material and an insulating second liquid material, both stored between the light transmissive materials, and includes a first electrode applying voltage to the first liquid material through a dielectric layer; and a second electrode conducted to the first liquid material, and
the dielectric layer is formed as an anodized portion made of a metal oxide formed by anodizing the first electrode.

12. The optical recording/reproduction device according to claim 11, further comprising:

a voltage applying unit applying voltage between the first electrode and the second electrode, and a capacitor both placed between the first electrode and the second electrode.

13. A droplet operation device comprising:
a substrate; and
an electrode array formed on the substrate and covered with a dielectric layer, wherein
a conductive or polar droplet is attached onto the dielectric layer,
a common electrode conducted to the droplet is provided such that the common electrode faces the electrode array,
the droplet operation device includes a voltage control unit controlling voltage applied between the common electrode and the electrode array to move the droplet in an array direction of the electrode array, and
the dielectric layer covering the electrode array is formed as an anodized portion made of a metal oxide formed by anodizing the electrode array.

14. The droplet operation device according to claim 13, further comprising:

a voltage applying unit applying voltage between the electrode array and the common electrode, and a capacitor both placed between the electrode array and the common electrode.

15. The droplet operation device according to claim 14, wherein the capacitor is a polar capacitor.

16. An optical element comprising:
a pair of light transmissive materials;
a conductive or polar first liquid material and an insulating second liquid material, both stored between the light transmissive materials;

a first electrode applying voltage to the first liquid material through a dielectric layer; and a second electrode conducted to the first liquid material, wherein any one of the first and second liquid materials is made of a material having a light transmittance lower than that of a material of the other liquid material, a shape of an interface between the first liquid material and the second liquid material is changed by controlling voltage applied to the first and second electrodes so that an amount of light transmitted through the first and second liquid materials is controlled, and the dielectric layer is formed as an anodized portion made of a metal oxide formed by anodizing the first electrode.

17. The optical element according to claim 16, further comprising:

a voltage applying unit applying voltage between the first electrode and the second electrode, and a capacitor, both placed between the first electrode and the second electrode.

18. The optical element according to claim 17, wherein the capacitor is a polar capacitor.

19. A zoom lens comprising:

at least one varifocal lens including a pair of light transmissive materials; and a conductive or polar first liquid material and an insulating second liquid material, both stored between the light transmissive materials, and including a first electrode applying voltage to the first liquid material through a dielectric layer; and a second electrode conducted to the first liquid material, and the at least one varifocal lens including at least two interfaces between the first liquid material and the second liquid material, wherein a shape of an interface between the first liquid material and the second liquid material is changed by controlling voltage applied to the first and second electrodes so that a focal length of the at least one varifocal lens is changed to control a magnification of the lens, and the dielectric layer of the varifocal lens is formed as an anodized portion made of a metal oxide formed by anodizing the first electrode.

20. The zoom lens according to claim 19, further comprising:

a voltage applying unit applying voltage between the first electrode and the second electrode, and a capacitor, both placed between the first electrode and the second electrode.

21. An imaging device comprising:

a zoom lens;

a varifocal lens;

an optical element having a diaphragm or shutter function; and a solid imaging element, wherein at least one of the zoom lens, the varifocal lens, and the optical element includes a pair of light transmissive materials; and a conductive or polar first liquid material and an insulating second liquid material, both stored between the light transmissive materials, and includes a first electrode applying voltage to the first liquid material through a dielectric layer; and a second electrode conducted to the first liquid material, wherein the dielectric layer is formed as an anodized portion made of a metal oxide formed by anodizing the first electrode.

22. The imaging device according to claim 21, further comprising:
a voltage applying unit applying voltage between the first electrode and the second electrode, and a capacitor, both placed between the first electrode and the second electrode.

23. A light modulating device comprising:
a pair of light transmissive materials; a conductive or polar first liquid material and an insulating second liquid material, both stored between the light transmissive materials; a first electrode applying voltage to the first liquid material through a dielectric layer; and a second electrode conducted to the first liquid material, wherein
any one of the first and second liquid materials is made of a material having a light transmittance lower than that of a material of the other liquid material,
a shape of an interface between the first liquid material and the second liquid material is changed by controlling voltage applied to the first and second electrodes so that a light modulating element is formed with an amount of light transmitted through the first and second liquid materials controlled corresponding to an input information signal, and
the dielectric layer is formed as an anodized portion made of a metal oxide formed by anodizing the first electrode.

24. The light modulating device according to claim 23, further comprising:
a voltage applying unit applying voltage between the first electrode and the second electrode, and a capacitor, both placed between the first electrode and the second electrode.

25. A display device comprising:
a light modulating device; and a light source device for inputting light to the light modulating device, wherein
the light modulating device includes a pair of light transmissive materials; and a conductive or polar first liquid material and an insulating second liquid material, both stored between the light transmissive materials, and
a first electrode applying voltage to the first liquid material through a dielectric layer; and a second electrode conducted to the first liquid material,
any one of the first and second liquid materials is made of a material having a light transmittance lower than that of a material of the other liquid material,
a shape of an interface between the first liquid material and the second liquid material is changed by controlling voltage applied to the first and second electrodes so that a light modulating element is formed with an amount of light transmitted through the first and second liquid materials controlled corresponding to an input information signal,
the dielectric layer provided in the light modulating device is formed as an anodized portion made of a metal oxide formed by anodizing the first electrode, and
the light modulating element is provided corresponding to a pixel.

26. The display device according to claim 25, further comprising:
a voltage applying unit applying voltage between the first electrode and the second electrode, and a capacitor, both placed between the first electrode and the second electrode.

* * * * *